US011887573B2

(12) United States Patent
Emri et al.

(10) Patent No.: US 11,887,573 B2
(45) Date of Patent: Jan. 30, 2024

(54) SOUND INSULATION ELEMENT

(71) Applicants: Igor Emri, Ljublljana (SI); Bernd-Steffen V. Bernstorff, Wachenheim (DE)

(72) Inventors: Igor Emri, Ljublljana (SI); Bernd-Steffen V. Bernstorff, Wachenheim (DE); Pavel Oblak, Vrhnika (SI); Anatolij Nikonov, Litija (SI)

(73) Assignees: Igor Emri, Ljublljana (SI); Bernd-Steffen V. Bernstorff, Wachenheim (DE)

( * ) Notice: Subject to any disclaimer, the term of this patent is extended or adjusted under 35 U.S.C. 154(b) by 481 days.

(21) Appl. No.: 17/054,852

(22) PCT Filed: May 8, 2019

(86) PCT No.: PCT/EP2019/061783
§ 371 (c)(1),
(2) Date: Nov. 12, 2020

(87) PCT Pub. No.: WO2019/219474
PCT Pub. Date: Nov. 21, 2019

(65) Prior Publication Data

US 2021/0217397 A1 Jul. 15, 2021

(30) Foreign Application Priority Data

May 16, 2018 (EP) .................................... 18172527

(51) Int. Cl.
*G10K 11/165* (2006.01)
*G10K 11/172* (2006.01)

(52) U.S. Cl.
CPC .......... *G10K 11/165* (2013.01); *G10K 11/172* (2013.01)

(58) Field of Classification Search
CPC .................................................... G10K 11/165
See application file for complete search history.

(56) References Cited

U.S. PATENT DOCUMENTS 5,744,763 A * 4/1998 Iwasa .................. G10K 11/165 181/290
10,006,513 B1 * 6/2018 Wang ...................... F16F 7/015
(Continued)

FOREIGN PATENT DOCUMENTS

CN 204010668 12/2014
WO WO-0232763 A1 * 4/2002 ............... B64C 1/40

OTHER PUBLICATIONS

Daniel M. Mueth et al., Force Distribution in a Granular Medium, Arxiv.org, Cornell University Library, 201 Olin Library Carnell University, Ithaca, NY 14853, Feb. 22, 1999, p. 6.
(Continued)

*Primary Examiner* — Forrest M Phillips
(74) *Attorney, Agent, or Firm* — Dority & Manning, P.A.

(57) ABSTRACT

The invention concerns a sound insulation element (10), that utilizes a strong force-network as a principle energy dissipating mechanism, whereat the strong force-network is generated through complex interactions of solid particles (14) in a granular system, which leads to formation of maximal number of interconnecting pairs-of-forces according to 3$^{rd}$ Newton's Law, whereat said strong force-network is realized by using a granular material (12) made from at least one solid material with a specific skewed multimodal particles-size-distribution, comprising a granular material (12) consisting of particles (14), and a supporting structure (40) having at least one cavity (42), whereat the at least one cavity (42) is filled with particles (14) of the granular material (12). A distribution assigning a number (N) of particles (14) to an equivalent outer diameter (D) of the particles (14) is selected such that the particles (14) form an energy dissipating strong force-network within the at least
(Continued)

one cavity (42), wherein the distribution assigning a number (N) of particles (14) to an equivalent outer diameter (D) of the particles (14) is an asymmetric distribution, wherein the distribution of equivalent outer diameters (D) of the particles (14) is multimodal, having several modes, and wherein said multimodal distribution is skewed, such that said multimodal distribution has one maximum mode (i) having a maximum number ($N_i$) of particles (14) assigned to a fundamental equivalent outer diameter ($D_i$) of particles (14), and wherein said multimodal distribution has at least one preceding mode (i−1) and at least one subsequent mode (i+1).

19 Claims, 18 Drawing Sheets

(56) References Cited

U.S. PATENT DOCUMENTS

2005/0194210 A1* 9/2005 Panossian ................. B32B 3/12 181/292

2005/0199458 A1* 9/2005 Dussac ................... F16F 7/015 267/136

OTHER PUBLICATIONS

International Search Report and Written Opinion for PCT/EP2019/061783 dated Jul. 31, 2019, 11 pages.

J.F. Peters et al., "Characterization of force chains in granular material", Physical Review E (Statistical, Nonlinear, and Soft Matter Physics), vol. 72, No. 4, Oct. 1, 2005, p. 40.

Kondic L. et al., "Topology of force networks in compressed granular media; Topology of force networks granular media", Europhysics Letters: A Letters Journal Exploring the Frontiers of Physics, Institute of Physics Publishing, Bristol, FR, vol. 97, No. 5, Feb. 28, 2012, p. 54001.

Kramar Miroslav et al., "Quantifying force networks in particulate systems", Physica D. Vo. 283, Jun. 9, 2014, pp. 37-55.

Lingran Zhang et al., "The role of force chains in granular materials: from statics to dynamics", European Journal of Environmental and Civil Engineering, vol. 21, No. 7-8, Jun. 16, 2016, pp. 874-895.

* cited by examiner

SOUND INSULATION ELEMENT

CROSS REFERENCE TO RELATED APPLICATIONS

This application is the U.S. National Stage entry of International Application Number PCT/EP2019/061783 filed under the Patent Cooperation Treaty having a filing date of May 8, 2019, which claims priority to European Application No. 18172527.6 having a filing date of May 16, 2018, which are incorporated herein by reference.

The invention relates to a sound insulation element that utilizes a strong force-network as a principle energy dissipating mechanism, whereat the strong force-network is generated through complex interactions of solid particles in a granular system, which leads to formation of maximal number of interconnecting pairs-of-forces according to 3$^{rd}$ Newton's Law, whereat said strong force-network is realized by using a granular material made from at least one solid material with a specific skewed multimodal particles-size-distribution. The sound insulation element comprises a granular material consisting of particles and a supporting structure having at least one cavity, whereat the at least one cavity is filled with particles of the granular material.

STATE OF THE ART

Sound insulation elements serve for sound absorption and sound shielding in a wide range of applications. Sound insulation elements are used, for example, in stationary sites like residential houses, offices or recording studios. On one hand, sound insulation elements prevent sound and noise to enter such sites that are insulated therewith, and on the other side, sound insulation elements prevent sound and noise to exit such insulated sites. Sound insulation elements are also used in mobile applications, in particular in vehicles, for example passenger cars, mobile homes, caravans, campers, railways, boats, yachts, ships, airplanes, and other transportation solutions.

Sound is an oscillation of pressure transmitted through gas, liquid, or solid in the form of a travelling wave generated by localized pressure variation in a medium. Sound may be absorbed, transmitted or reflected, FIG. 1*a*. When a boundary is hit by a sound wave, some of the sound energy will be reflected, some is absorbed within the material and some is transmitted through it. The proportion which is reflected, absorbed or transmitted depends on the material properties and shape of the boundary hit by the sound wave, and the frequency of the sound. If, for example, the boundary is absolutely rigid, i.e., modulus of the material and stiffness of the boundary are infinite, all of the sound is reflected, FIG. 1*b*.

Modulus of real materials is always finite. Therefore, some of the sound energy always enters the material as waves. If stiffness of the boundary is high, obtained with thickness of the boundary, waves are the only mechanism of sound transmission through the boundary. However, when the stiffness of the boundary is small a substantial part of the sound energy is transmitted by means of macroscopic vibrations of the boundary, FIG. 1*c*.

When insulation is fixed to an elastic boundary, assuring direct contact between boundary and insulation, pressure waves are transmitted directly from the boundary into the insulation through the contact between two solid bodies. In addition, the vibrating boundary also enforces macroscopic vibrations of the insulation. In this case the insulation essentially acts more as vibration insulation than as sound insulation, FIG. 1*d*.

Document EP 2 700 838 A1 discloses a railway sleeper with a damping element for absorbing mechanical excitations generated by a wheel of a locomotive on a rail, hence, solid-solid interaction. Said railway sleeper also serves for noise reduction within such a railway structure. Thereat, the noise reduction is achieved by reducing vibrations of rails, wheels and other structural elements that, as a consequence, generate the so-called structure-born noise. Hence, document EP 2 700 838 A1 describes damping elements for reduction of mechanical vibrations of solid bodies that are a source of structure-borne noise.

Document EP 2 700 839 A1 discloses a damping element for absorbing mechanical vibrations of solid bodies at a given frequency. The damping element for vibration insulation comprises a container that is filled with a viscoelastic material, which can be a granular or bulk viscoelastic material. Said damping element is then pressurized to increase the stiffness of the element and to shift the maximum of its inherent material damping towards the excitation frequency of an external loading. Said damping element in particular serves for damping of mechanical vibrations of solid bodies at distinct frequencies.

Document GB 2 064 988 A discloses a sound-damping mat comprising flexible layer of material having open pores or cells that are at least in part filled with particles of a higher specific gravity, respectively density, than the material of which the layer is made. The particles are bonded to each other and to the walls between the pores or cells by adhesive. By choosing different materials for flexible layers, added particles, and adhesive, it is possible to control the stiffness of such sound insulation. By increasing the stiffness, one may control the amount of noise that is transmitted through the insulation as macroscopic vibrations of the layered composite. Added particles of higher specific gravity, respectively density, will also increase dissipation of waves traveling through the sound-damping mat through reflection, refraction and interference of sound waves. This insulation is a typical state of the art of a multilayer sound insulation currently present on the market. The document also explains the technological procedure for producing such composite sound insulation.

Document WO 2008/021455 A2 discloses a sound attenuation by placing a relatively thin layer of nanocomposite material on a wall, such as a housing of a computer. Sound insulating nanocomposite material is obtained by dispersing nano-particles into a polymeric matrix. Thereat, nanofillers increase the elastic modulus of a polymeric matrix and hence contribute to reduction of the macroscopic vibration of the insulating wall. Simultaneously, adding nanofillers to a polymer will reduce the wave propagation inside the insulating nano-composite layer since the nanofillers will act as obstacles for traveling sound pressure waves, causing reflection and refraction of sound waves.

Document US 2003/0098389 A1 discloses the use of different granular materials having a bulk sound speed of less than 90 m/s for damping vibrations and structure born noise generated in aircraft and particularly in helicopter structures. The inventive idea is to reduce the level of vibrations by filling the empty cavities of structural elements with such granular materials to achieve reduction of vibrations through friction. The document displays the model describing friction as energy absorbing mechanism. Friction occurs between granular particles and in particular through friction between granular particles and structure walls. To increase the exchange area for friction between the interior faces of the walls and aggregate internal partitions are introduced.

Document US 2006/0037815 A1 utilizes plurality of particles with a density of at least 1 g/cm$^3$ and includes a material that is viscoelastic, elastomeric and/or polymeric to reduce noise and vibrations. By adding to the viscoelastic granular materials different additives made from variety of other materials, and by modifying size, shape and density of particulate insulation material, various performance applications can be achieved, such as reducing vibrational energy, acoustic energy, thermal energy, electromagnetic energy and/or radio waves. These granular materials may be spread over flat surface or fill the cavities of walls in a form of free flowing dry particles. Such particles contact each other and form an insulation with plurality of dead air-cells substantially distributed between the particles. These dead air-cells, along with the specific density and viscoelastic properties of the polymer provide both thermal and acoustic isolation and damping. The particulate isolation can be provided in a coating or paste that can be adhered to the surface. The damping is achieved by using a plurality of free-floating particles with density of at least about 1 g/cm$^3$ and including material at least one of a viscoelastic, elastomeric, or polymeric material. The document stresses the importance of using viscoelastic materials to utilize the internal damping of such materials and the energy absorbing effect of the free-floating particles.

Document US 2005/0194210 A1 discloses the "Non-Obstructive Particle Damping Technique" for reducing noise in an aircraft cabin, where particles of various materials collide with, both, one another and with the structure in which particles are located. In this process they exchange momentum and convert energy to heat via friction between the particles, and particles and inner surface of the structure. Thus, energy dissipation occurs due to frictional losses, i.e., when particles either rub against each other or against the structure, and due to inelastic particle-to-particle collision.

Document U.S. Pat. No. 5,304,415 A discloses the usage of porous members of foamed urethanes, glass-wool and alike filled with powder particles having sound absorbing characteristics in a "vibratable state". The sound pressure waves are reduced due to viscosity friction yielded by walls of the foams or pores while the sound wave propagates through the foams or pores and due to incidence with vibrating particles.

Document US 2005/0109557 A1 discloses sound proofing panels consisting of layers formed by hollow spherical beads having porous micro-perforated walls that enables a large amount of sound energy to be dissipated by the viscothermal effect of the air. Hence, the sound energy is thus dissipated mainly by the viscothermal effect of air passing thorough the dissipating layers, and to a smaller extend through the porous wall.

Document EP 1 557 819 A1 discloses sound absorbing structures and process how to produce them. The structures consist of hollow sphere partially filled with particles whereas these particles can freely move inside the hollow structures. The hollow structures can then be assembled to form sound insulating structures.

Document U.S. Pat. No. 5,744,763 A discloses sound-proofing material applied to a vehicle hood panel on the side facing the engine compartment. The sound proofing material has a sheet-like form and includes pulverized rubber layer containing rubber grains of various kinds of material, various sizes and various shapes and covering layers which cover the pulverized rubber layer. In this embodiment the noise is being absorbed by rubber grains themselves contained in the pulverized rubber layer and by air gaps present between the grains. The document claims that the energy of sound is absorbed by the viscosity resistance and heat transfer of the air present between the rubber grains, and by friction among the rubber grains that are in contact with one another, thereby converting the energy within the noise into vibrational energy and thermal energy. By mixing various kinds of rubber grains with different acoustic absorptivity the insulation can efficiently absorb plurality of sound frequencies.

Document CN 204 010 668 U discloses the usage of particles to form a perforated plate structure, whereas the acoustic pores can be considered as a plurality of air resonance sound absorbing structure (Helmholtz resonator). The air in the cavity resonates and turns from friction to heat loss, thereby causing sound absorption.

Document US 2005/194210 A1 discloses partly filled honeycomb structures for damping structural vibration and noise energy via the flexure (i.e. bending) of the viscoelastic materials, which dissipates mechanical (vibration) energy by converting it into heat. The document claims the so called Non-Obstructive Particle Damping (NOPD) mechanism, where particles of various materials collide with both each another and with the structure in which particles are located, exchanging momentum and converting vibrational energy to heat via friction between the particles. Thus, energy dissipation occurs due to both friction losses and inelastic particle-to-particle collisions. NOPD focuses on energy dissipation by combination of collision, friction and shear damping.

Summarizing the physical principles used for damping sound and vibrations according to the state of the art, one may conclude that none of the existing solutions utilizes strong force-networks as a principle energy dissipation mechanism, which was found to be material independent and superior to any other currently known dissipative mechanism. It should be stated, that any cavity filled with particles might form some force chains along contacting particles and therefore form a "weak force-network". However, only when the number of force chains are maximised by applying a specific particles size-distribution, a "strong force-network" will be formed.

DESCRIPTION OF THE INVENTION

It is an object of the invention to provide a granular sound insulation element that utilizes strong force-networks as a dissipative mechanism and that provides increased sound absorption and noise reduction compared to granular sound insulation elements known from prior art.

A force-network is generated through complex interactions of solid particles in a granular system, which leads to formation of a number of interconnecting pairs-of-forces according to 3$^{rd}$ Newton's Law forming a force-chain. A massive number of force-chains form a force-network that scatters the direction of the force transmission of an incoming sound pressure wave.

Force-chains and force-networks are known to persons skilled in the art. For example, the documents N. S. Nguyen and B. Brogliato, "Multiple Impacts in Dissipative Granular Chains", Lecture Notes in Applied and Computational Mechanics, Vol. 72, Springer (2014); K. E. Daniels, "The role of force networks in granular materials", EPJ Web of Conferences 140, *Powders & Grains* (2017); QICHENG SUN et al, "Understanding Force Chains in Dense Granular Materilas", *Int. J. Mod. Phys.* 824, 5743 (2010); P. Richard, M. Nicodemi, R. Delannay, P. Ribiere, and D. Bideau, "Slow relaxation and compaction of granular systems", *Nature Materials, Vol* 4, February 2005; E. Somfai, J.-N. Roux, J. H. Snoeijer, M. van Hecke, and W. van Saarloos, "Elastic wave propagation in confined granular system", Physical Review E 72, 021301 (2005); L. Zhang, N. G. H. Nguyen, S. Lambert, F. Nicot, F. Prunier & I. Djeran-Maigre, "The role of force chains in granular materials: from statics to dynamics", European Journal of Environmental and Civil Engineering, DOI:10.1080/19648189.2016.1194332 (2016); describe features of force-networks.

Furthermore, literature, such as, M. Kramar, A. Goullet, L. Kondie, and K. Mischaikow, "Quantifying force networks in particulate systems", Physica D, 283, 32-55,(2014); R. Arevalo, I. Zuriguel, and D. Maza, "Topology of the force network in the jamming transition of an isotopically compressed granular packing", Physical Review E, 81, 041302, (2010); F. Radjai, D. E. Wolf, M. Jean, J.-J. Moreau, "Bimodal Character of Stress Transmission in Granular Packings", Physical Review Letters, Vol. 80, No. 1, (1998); distinguishes between "weak" and "strong" force-networks, depending on their topology and size, i.e., number of formed pairs-of-forces that bear the load. At present the formation mechanisms how to obtain the "weak" and the "strong" force-networks are not understood.

It was accidentally found that the particular particles size-distribution as claimed in this patent leads to formation of the "strong" force-networks which consume an enormous amount of energy making them the dominating dissipation mechanisms over the dissipation mechanisms mentioned in the state of the art: friction, viscoelastic damping, particles collision, and viscothermal effect.

All granular materials sound insulation elements could form common energy-dissipating force-networks that lead to a certain sound pressure level reduction (SPLR), FIG. 2*a*.

It is an objective of the invention to utilize a specific granular particle size-distribution and a specific size of the cavities to allow the formation of strong force-networks leading to much higher sound pressure level reduction, FIG. 2*b*, than known from prior art.

A sound Insulation element is provided that utilizes a strong force-network as a principle energy dissipating mechanism, whereat the strong force-network is generated through complex interactions of solid particles in a granular system, which leads to formation of maximal number of interconnecting pairs-of-forces according to $3^{rd}$ Newton's Law, whereat said strong force-network is realized by using a granular material made from at least one solid material with a specific skewed multimodal particles-size-distribution. The sound insulation element comprises a granular material consisting of particles with a specific particles size-distribution and a supporting structure having at least one cavity, whereat the at least one cavity is filled with particles of the granular material. The supporting structure serves merely for keeping the granular material in a selected position in space, in particular in a vertical position.

The size of a particle may be defined with the diameter of a circle that surrounds the particle and touches its boundary in at least two points. Any other way of describing particles sizes, such as diameter of an inner circle, or diameter of a spherical particle that has equivalent volume or mass, would equally well describe the claimed particles size-distribution.

According to the invention, a distribution assigning a number of particles to an equivalent outer diameter of the particles is selected such that the particles form an energy dissipating strong force-network within the at least one cavity. Therein, the distribution assigning a number of particles to an equivalent outer diameter of the particles is an asymmetric distribution, i.e. deviates from a symmetric distribution. Therein, the distribution of equivalent outer diameters of the particles is multimodal, having several modes. Thereat, said multimodal distribution is skewed, such that said multimodal distribution has one maximum mode having a maximum number of particles assigned to a fundamental equivalent outer diameter of particles, and wherein said multimodal distribution has at least one preceding mode and at least one subsequent mode.

That means, said multimodal distribution is not symmetric to any of the modes. The distribution of equivalent outer diameters of the particles is selected such to assure tight filling of the cavities with particles which is required for strong force-network formation. In such a distribution, diameters of the particles and their corresponding number of particles belonging to a given mode of the multimodal distribution should be in accordance to a certain ratio as described in continuation.

It was found that said multimodality of distribution should be skewed, for example negatively, as shown in FIG. 4*a*, or positively, as shown in FIG. 4*c*. Negatively skewed multimodality has several modes of properly selected particles sizes, $D_{i-1}$, $D_{i-2}$, . . . , to the left of the maximum mode $D_i$, whereas the positively skewed multimodality has several modes of properly selected particles sizes, $D_{i+1}$, $D_{i+2}$, . . . , to the right of the maximum mode $D_i$. In both cases, the skewness of the multimodality is obtained by proper selection of the number of particles $N_k$ assigned to the corresponding equivalent outer diameter $D_k$ of the modes, whereat k=i−3, i−2, i−1, i, i+1, i+2, i+3, . . . .

It was found that positive and negative skewness of said multimodality lead to different kinds of strong force-network topological forms, which allow the adjustment of frequency characteristics of the sound insulation.

For clarity, it should be stated that a deviation from symmetry does not imply that a distribution is multimodal, and vice versa, multimodality does not imply that a distribution is skewed.

The invention is based on the intuitive realisation that sound insulation is essentially a process of dissipating kinetic energy of vibrating air, respectively sound pressure waves that excite the sound insulation, involving complex interactions between vibrating air and solid matter enforcing the formation of a force-network. Sound insulation according to the invention is not based on material properties, as it is understood today and considered in existing solutions available, but on a process of forming dissipative force-networks that are material independent. This is demonstrated in FIGS. 3*a* to 3*d*, where insulations were made from different granular materials, i.e., 3*a*—waste tires, 3*b*—LDPE, 3*c*—wood sawdust, and 3*d* PMMA, and all four insulations exhibit the same frequency dependence of the insulation.

Hence, the invention relates to sound insulation based on the formation of a strong force-network between the granular particles within the supporting structure of the insolation element. It was found that formation of the strong force-network is a very effective way to scatter the incoming sound pressure waves. The pressure wave is transmitted to the force-network formed by the granular particles that are located in the cavities of the supporting structure. It was found that a properly selected multimodal particles size distribution will lead to a very high force-network energy absorption. At the same time such a properly selected particles size distribution will also minimize the remaining space between the network forming particles enforcing the sound pressure transmission mostly via the force-network, as shown for example in FIG. 4$b$ and FIG. 4$d$.

Accidentally it was also found that the common distributions of particles do not lead to the force-networks with the efficiency that would prevail over the dissipation mechanisms mentioned in the state of the art. In literature such force-networks are known as weak force-networks. As an example, FIG. 2 shows the comparison of the measured sound pressure level reduction of an insulation made from the sawdust with a common particle size distribution (see FIG. 2$a$), resulting in a weak force-network, and the insulation made from the same sawdust after adjusting the distribution of sawdust particles according to the here claimed particles size distribution (see FIG. 2$b$), resulting in a strong force-network.

Surprisingly it was found out that periodic generation of a force-network requires continuous energy input and may be utilized as a dissipative mechanism. It was found out that the amount of dissipated energy depends on the number of contact forces, which may be maximized by using granular materials with the claimed particles size distribution. Such a system of granular materials with maximized number of contact forces represents a dissipative network of interacting bodies which is called a strong force-network. It was also found out that periodic formation of a strong force-network, enforced by the periodic interaction of vibrating air, respectively sound, and granular materials with defined particles size distribution, is the governing dissipative mechanism of the newly invented sound insulation.

In the case of sound pressure waves interacting with granular materials with defined particles size distribution, such strong force-networks periodically appear and disappear, and dissipate tremendous amount of energy.

It was also found out that by modifying composition of the interacting particles by adjusting their sizes and quantities of particles with a given size, the size of a force-network and the energy dissipation process is controllable. The properly selected distribution of the diameters of the particles optimizes the size of the force-network.

The sound insulation element according to the present invention comprises granular particles distributed in cavities of the supporting structure such as open cell foams to allow formation of strong force-networks. Hence, the invented sound insulation element is not material dependent but rather dissipative-process-dependent.

Surprisingly, it was found that by proper selection of the granular particles sizes and their number proportion, the size and structure, respectively the topology of the formed strong force-networks can be optimized such so that the force-network dissipates a maximum amount of energy. To increase the number of contact points of adjacent particles and thereby also reducing the spacing between particles, it is beneficial to use particles with a very wide span of particle diameters.

Preferably, the particles of the granular material have an equivalent outer diameter which is between 0.0001 mm and 10 mm. Exceedingly preferably, the particles of the granular material have an equivalent outer diameter which is in a range between 0.001 mm and 4 mm. Especially particles having equivalent outer diameters in said range allow formation of strong force-networks.

Preferably, the at least one preceding mode has a preceding number of particles assigned to a preceding equivalent outer diameter of particles which is smaller than the fundamental equivalent outer diameter of particles of the maximum mode. Furthermore, the at least one subsequent mode has a subsequent number of particles assigned to a subsequent equivalent outer diameter of particles which is bigger than the fundamental equivalent outer diameter of particles of the maximum mode.

The maximum number of particles is bigger than the preceding number of particles. The maximum number of particles is also bigger than the subsequent number of particles.

According to a possible embodiment of the invention, the multimodal distribution has at least a section to the left of the maximum mode which comprises several modes and which comprises the maximum mode, whereat the number of particles assigned to the equivalent outer diameter of the particles is decreasing when the equivalent outer diameter of the particles is decreasing, such that an envelope curve over the mode peaks is negatively skewed. When the envelope curve over the mode peaks is negatively skewed, then the slope of said envelope curve is positive. Preferable, the negatively skewed multimodality has at least two modes to the left of the maximum mode, as shown in FIG. 4$a$.

In particular, the particles are chosen such that the multimodal distribution has at least a section which comprises several modes and which comprises the maximum mode, whereat a number of particles $N_k$ assigned to the equivalent outer diameter $D_k$ of any elected mode k within said section is bigger than a number of particles assigned to the equivalent outer diameter of an adjacent mode, if the equivalent outer diameter $D_k$ of the elected mode k is bigger than the equivalent outer diameter of the adjacent mode, such that an envelope curve over the modes is negatively skewed within said section.

Preferably, within said section in which the envelope curve over the mode peaks is negatively skewed, a ratio $$RD_k=\{D_k/D_{k-1}\}_{k=i,i-1,i-2,\ldots}=\{D_i/D_{i-1},D_{i-1}/D_{i-2},D_{i-2}/D_{i-3},\ldots\}$$

is bigger or equal to 1.2 and is smaller or equal to 2.1, such that $$1.2\le RD_k\le 2.1,\text{ with }k\le i.$$

Thereat, a number of particles $N_k$ assigned to the equivalent outer diameter $D_k$ of an elected mode k is bigger than a number of particles $N_{k-1}$ assigned to the equivalent outer diameter $D_{k-1}$ of an adjacent mode k−1.

Further preferably, within said section in which the envelope curve over the mode peaks is negatively skewed, said ratio $RD_k$ is bigger or equal to 1.4 and is smaller or equal to 1.9. Even further preferably, within said section in which the envelope curve over the mode peaks is negatively skewed, said ratio $RD_k$ is bigger or equal to 1.5 and is smaller or equal to 1.8.

Especially preferably, within said section in which the envelope curve over the mode peaks is negatively skewed, a ratio $$RD_k=\{D_k/D_{k-1}\}_{k=i,i-1,i-2,\ldots}=\{D_i/D_{i-1},D_{i-1}/D_{i-2},D_{i-2}/D_{i-3},\ldots\}$$

is equal to $(1+\sqrt{5})/2$ or to any integer multiplier of said value, such that $$RD_k=(1+\sqrt{5})/2\text{ or }RD_k=n*(1+\sqrt{5})/2,\text{ with }k\le i\text{ and }n=\text{integer}.$$

Thereat, a number of particles $N_k$ assigned to the equivalent outer diameter $D_k$ of an elected mode k is bigger than a number $N_{k-1}$ of particles assigned to the equivalent outer diameter $D_{k-1}$ of an adjacent mode k−1.

Said ratio $(1+\sqrt{/5})/2$ which is about 1.618 is also known as the Golden Ratio. Hence, within said section which is negatively skewed, the ratio $RD_k$ between an equivalent outer diameter $D_k$ of an elected mode k and an equivalent outer diameter $D_{k-1}$ of an adjacent mode k−1 preferably corresponds to the Golden Ratio or deviates from the golden Ratio less than 30%, or less than 20%, or less than 10%.

According to another possible embodiment of the invention, the multimodal distribution has at least a section to the right of the maximum mode which comprises several modes and which comprises the maximum mode, whereat the number of particles assigned to the equivalent outer diameter of the particles is decreasing when the equivalent outer diameter of the particles is increasing, such that an envelope curve over the mode peaks is positively skewed. When the envelope curve over the mode peaks is positively skewed, then the slope of said envelope curve is negative. Preferable, the positively skewed multimodality has at least two modes to the right of the maximum mode, as shown in FIG. 4*c*.

In particular, the particles are chosen such that the multimodal distribution has at least a section which comprises several modes and which comprises the maximum mode, whereat a number of particles $N_k$ assigned to the equivalent outer diameter $D_k$ of any elected mode k within said section is bigger than a number of particles assigned to the equivalent outer diameter of an adjacent mode, if the equivalent outer diameter $D_k$ of the elected mode k is smaller than the equivalent outer diameter of the adjacent mode, such that an envelope curve over the modes is positively skewed within said section.

Preferably, within said section in which the envelope curve over the mode peaks is positively skewed, a ratio $$RD_k=\{D_k/D_{k+1}\}_{k=i,i+1,i+2,\ldots}=\{D_i/D_{i+1},D_{i+1}/D_{i+2},D_{i+2}/D_{i+3},\ldots\}$$

is bigger or equal to 0.45 and is smaller or equal to 0.8, such that $$0.45\leq RD_k\leq 0.8,\text{ with }k\leq i.$$

Thereat, a number of particles $N_k$ assigned to the equivalent outer diameter $D_k$ of an elected mode k is bigger than a number of particles $N_{k+1}$ assigned to the equivalent outer diameter $D_{k+1}$ of an adjacent mode k+1.

Further preferably, within said section in which the envelope curve over the mode peaks is positively skewed, said ratio $RD_k$ is bigger or equal to 0.5 and is smaller or equal to 0.75. Even further preferably, within said section in which the envelope curve over the mode peaks is positively skewed, said ratio $RD_k$ is bigger or equal to 0.55 and is smaller or equal to 0.7.

Especially preferably, within said section in which the envelope curve over the mode peaks is positively skewed, a ratio $$RD_k=\{D_k/D_{k+1}\}_{k=i,i+1,i+2,\ldots}=\{D_i/D_{i+1},D_{i+1}/D_{i+2},D_{i+2}/D_{i+3},\ldots\}$$

is equal to $(1+\sqrt{5})$ or to any integer divider of said value, such that $$RD_k=(1+\sqrt{5})\text{ or }RD_k=2/(n*(1+\sqrt{5})),\text{ with }k\leq i\text{ and }n=\text{integer.}$$

Thereat, a number of particles $N_k$ assigned to the equivalent outer diameter $D_k$ of an elected mode k is bigger than a number of particles $N_{k+1}$ assigned to the equivalent outer diameter $D_{k+1}$ of an adjacent mode k+1.

Said ratio $2/(1+\sqrt{5})$ which is about 0.618 is the reciprocal value of the Golden Ratio. Hence, within said section which is positively skewed, a ratio $RD_k$ between an equivalent outer diameter $D_k$ of an elected mode k, and an equivalent outer diameter $D_{k+1}$ of an adjacent mode k+1 preferably corresponds to the reciprocal value of the Golden Ratio or deviates from the reciprocal value of the golden Ratio less than 30%, or less than 20%, or less than 10%.

According to an advantageous further development of the invention, within a section in which the envelope curve over the mode peaks is negatively skewed, ratios $$RN_k=\{N_k/N_{k-1}\}_{k=i,i-1,i-2,\ldots}=\{N_i/N_{i-1},N_{i-1}/N_{i-2},\ldots\}$$

are bigger or equal to 1.2 and are smaller or equal to 2.1, such that $$1.2\leq RN_k\leq 2.1,\text{ with }k\leq i.$$

Thereat, a number of particles $N_k$ assigned to the equivalent outer diameter $D_k$ of an elected mode k is bigger than a number of particles $N_{k-1}$ assigned to the equivalent outer diameter $D_{k-1}$ of an adjacent mode k−1.

Preferably, within said section in which the envelope curve over the mode peaks is negatively skewed, said ratios $RN_k$ are bigger or equal to 1.4 and are smaller or equal to 1.9. Further preferably, within said section in which the envelope curve over the mode peaks is negatively skewed, said ratios $RN_k$ are bigger or equal to 1.5 and are smaller or equal to 1.8.

According to another advantageous further development of the invention, within a section in which the envelope curve over the mode peaks is negatively skewed, ratios $$RN_k=\{N_k/N_{k-1}\}_{k=i,i-1,i-2,\ldots}=\{N_i/N_{i-1},N_{i-1}/N_{i-2},\ldots\}$$

are equal to $(1+\sqrt{5})/2$ or to any integer multiplier of said value, such that $$RN_k=(1+\sqrt{5})/2\text{ or }RN_k=n*(1+\sqrt{5})/2,\text{ with }k\leq i\text{ and }n=\text{integer.}$$

Thereat, a number of particles $N_k$ assigned to the equivalent outer diameter $D_k$ of an elected mode k is bigger than a number of particles $N_{k-1}$ assigned to the equivalent outer diameter $D_{k-1}$ of an adjacent mode k−1.

Said ratio $(1+\sqrt{5})/2$ which is about 1.618 is also known as the Golden Ratio. Hence, within said section which is negatively skewed, the ratios $RN_k$ between a number of particles $N_k$ of an elected mode k and a number of particles $N_{k-1}$ of an adjacent mode k−1 preferably correspond to the Golden Ratio or deviate from the golden Ratio less than 30%, or less than 20%, or less than 10%.

Alternatively or additionally, within a section in which the envelope curve over the mode peaks is positively skewed, ratios $$RN_k=\{N_k/N_{k+1}\}_{k=i,i+1,i+2,\ldots}=\{N_i/N_{i-1},N_{i+1}/N_{i+2},\ldots\}$$

are bigger or equal to 1.2 and are smaller or equal to 2.1, such that $$1.2\leq RN_k\leq 2.1,\text{ with }k\geq i.$$

Thereat, a number of particles $N_k$ assigned to the equivalent outer diameter $D_k$ of an elected mode k is bigger than a number of particles $N_{k+1}$ assigned to the equivalent outer diameter $D_{k+1}$ of an adjacent mode k+1.

Preferably, within said section in which the envelope curve over the mode peaks is positively skewed, said ratios $RN_k$ are bigger or equal to 1.4 and are smaller or equal to 1.9. Further preferably, within said section in which the envelope curve over the mode peaks is positively skewed, said ratios $RN_k$ are bigger or equal to 1.5 and are smaller or equal to 1.8.

Alternatively or additionally, within a section in which the envelope curve over the mode peaks is positively skewed, ratios $$RN_k=\{N_k/N_{k+1}\}_{k=i,i+1,i+2,\ldots}=\{N_i/N_{i-1},N_{i+1}/N_{i+2},\ldots\}$$

are equal to $(1+\sqrt{5})/2$ or to any integer multiplier of said value, such that $$RN_k=(1+\sqrt{5})/2 \text{ or } RN_k=n^*(1+\sqrt{5})/2, \text{ with } k\geq i \text{ and } n=\text{integer.}$$

Thereat, a number of particles $N_k$ assigned to the equivalent outer diameter $D_k$ of an elected mode k is bigger than a number of particles $N_{k+1}$ assigned to the equivalent outer diameter $D_{k+1}$ of an adjacent mode k+1.

Said ratio $(1+\sqrt{5})/2$ which is about 1.618 is also known as the Golden Ratio. Hence, within said section, which is positively skewed, the ratios $RN_k$ between a Number of particles $N_k$ of an elected mode k and a Number of particles $N_{k+1}$ of an adjacent mode k+1 preferably correspond to the Golden Ratio or deviate from the golden Ratio less than 30%, or less than 20%, or less than 10%.

It was also found out that such skewness can preferably be obtained by mixing several groups of granular particles with different symmetric particles size distribution. Surprisingly, it was found out that when mixing several groups of granular particles with different average particle sizes, the number of particles is relevant to specify a quantity of particles from individual groups rather than their weight or volume.

It was found out, that such an arrangement according to the invention can establish a sound insulation element that has sound absorption and noise reduction properties which are considerably better than those of elements known in prior art. A sound insulation element according to the invention having the same thickness as a rigid foam board, for example, may have at least three times better noise reduction properties, measured in sound pressure level, than said rigid foam board, or a soft foam board, or a stone wool. The strong force-network can, for example, be formed of particles made from a grinded waste tires rubber, or any other solid material or their mixture.

Noise reduction also depends on acoustic frequency. The relation of noise reduction of the sound insulation element according to the invention compared to noise reduction of a rigid foam board having the same thickness varies with varying acoustic frequency. As stated above, frequency characteristics of the invented sound insulation may be adjusted with an adjustment of the multimodal granular particles size distribution skewness. Within a given frequency range of for example 10 Hz to 20 kHz that is audible for human, sound reduction of the sound insulation element according to the invention is however at least three times better, measured in sound pressure level, than noise reduction of a rigid or soft foam board or stone wool having the same thickness.

Surprisingly it was found out that the energy dissipation process of strong force-networks is material independent. Preferably, the particles of the granular material are solid. The particles can be produced from organic or non-organic solid material. The origin and chemical composition of granular material is not important, as long as particles stiffness is sufficient to form a dissipative strong force-network. Hence, the particles of a granular material may originate from various solid materials. For example, the particles may be made of metal, having metallic bonds. The particles may also be made of a salt, having ionic bonds. Also, the particles can be made of a plastic material, having covalent bonds. The particles can be made of an organic raw material as well as of a non-organic raw material. In particular, the particles can be made of sand, of polymer, of rubber or of wood. Consequently, the particles may be made from almost any organic or inorganic waste materials, such as waste tires, old bottles, wooden saw dust, waist metals, stone dust and similar. In fact, granular particles may be produced by grinding any solid products that should not contain any toxic substances.

All particles, or almost all particles, of the granular material may originate from the same raw material. Hence, the granular material contains only particles with one kind of raw material and thus has a homogeneous composition of particles.

The particles of the granular material may also originate from different raw materials. Hence, the granular material contains a mixture of particles with several kinds of raw material and thus has a heterogeneous composition of particles.

The granular material may contain particles with spherical geometry. Hence, the particles are shaped like regular balls or pearls. In this case, the size of said particles can be expressed by their outer diameter. The granular material may also contain particles with complex geometry that deviates from shapes like regular balls or pearls. The size of said particles can be expressed by the equivalent outer diameter.

The equivalent outer diameter of such a particle corresponds to the outer diameter of a particle that has spherical geometry and that has the same volume or mass. Alternatively, the outer diameter of a particle may be defined with a diameter of a sphere into which the particle may be placed such so that it touches the surface of a sphere in at least two points. The granular material may in particular contain a mixture of particles with spherical geometry and of particles with complex geometry.

The particles of the granular material may have various kinds of structures. Granular material may contain particles which are solid, it also may contain particles which are hollow. The granular material may also contain particles which are porous. The granular material may in particular contain a mixture of particles with different structures and shapes.

The role of the supporting structure is merely to keep the granular material in place. Hence, its role is structural only. Consequently, the supporting structure may be made of anything that fulfil this role. Preferably, the supporting structure is made of porous material, in particular produced from organic or non-organic solid material, or woven from organic or non-organic fibres, or structure produced with electrospinning, or 3D printing.

The supporting structure may simply be any hollow spaces in the frame or body of walls or floor of buildings or of the body structure of cars, train wagons, boats, yachts, ships, airplanes, housing of vibrating equipment, and may be simply filled with granular material with skewed multimodal particle size distribution.

In other embodiment of this invention the supporting structure may have a porous composition and may have various kinds of structures and can be made of various kinds of materials. For example, the supporting structure can be made of a flexible material. The supporting structure can also be made of a rigid material. The supporting structure having a porous composition can for example be made of a single-layer material. The supporting structure can also be made of a multi-layer material.

The supporting structure can be made of porous foam. As a further example, the supporting structure can be designed as a three-dimensional net. In particular, the supporting structure can be made of a woven fabric. Alternatively, the supporting structure can be made of a non-woven fabric.

The cavities of the supporting structure may have a complex geometry that deviates from a shape like a regular hollow sphere. The size of such cavities can be expressed by an equivalent inner diameter. The equivalent inner diameter of such a cavity corresponds to the inner diameter of a cavity that has hollow spherical geometry and that has the same volume. Therefore, in the following, the size of the cavities of the supporting structure is expressed by their equivalent inner diameter.

The inner diameter of the cavities is larger than the equivalent outer diameter of the largest particles and in addition should accommodate sufficient number of smaller particles to fill the cavity and prevent particles motion in order to form the strong force-network. Preferably, the inner diameter is selected large enough to accommodate a sufficient number of particles from the complete particles size distribution to maximize the number of contact points between the particles that form the strong force-network.

Preferably, the particles are tightly arranged in the cavities such that the particles form a strong force-network within the cavities. In particular, the particles of the granular material are arranged in the cavities of the supporting structure such that the particles forming the strong force-network within the cavities fill at least 70% of their volume.

According to a further development of the invention, when the supporting structure is made of a woven fabric or a non-woven fabric, said woven fabric or said non-woven fabric is preferably made of bio-fibres and/or of synthetic-fibres and/or of a combination of said fibres. Again, in principle it may be made of any material as long as it holds granular particles in place in a required position.

According to another further development of the invention, when the supporting structure is made of a woven fabric or a non-woven fabric, said woven fabric or said non-woven fabric is made of metallic-fibres and/or of glass-fibres and/or of carbon-fibres and/or of basalt-fibres and/or of a combination of said fibres. Hence, the supporting structure is high-temperature resistant.

Preferably, in particular if the supporting structure is high-temperature resistant, the cavities of the supporting structure are filled with particles that are non-organic and also high-temperature resistant. Especially, said particles are made of a material which resists high temperatures up to 3400 C°.

According to an advantageous embodiment of the invention, the supporting structure is covered by a cover. The function of said cover is in particular to hold the granular particles inside the cavities of the supporting structure. It is a further function of said cover to prevent dirt or humidity to enter the cavities of the supporting structure and to get in contact with the granular material. In an embodiment of this invention, the cover may be non-porous.

In other embodiment of this invention the cover has pores with an equivalent pore diameter which is smaller than the equivalent outer diameter of the smallest particles. Such an arrangement allows sound waves to enter the insulation structure and the insulation assumes superb sound absorbing and sound insulating properties.

A sound insulation element according to the invention can be used in several applications. Such applications are particularly automotive applications, mechanical engineering applications, electrical engineering applications, aerospace engineering applications, transport engineering applications, naval engineering applications and civil engineering applications.

Subsequently, a method for producing granular material for a sound insulation element is described, whereat the particles of said granular material have skewed multimodal distribution of their equivalent outer diameters with proper ratio of their number and particles sizes in order to maximize the size of the dissipative strong force-network. The method for producing said granular material includes the following steps:

In a first step granular material may be prepared from any solid substance independently of its origin and chemical composition. Granular material may be prepared with any of the existing technologies currently used for grinding.

In a second step, granular raw material is filtered for separating particles according to their equivalent outer diameters. Thereat particles are obtained with different average equivalent outer diameters with mono-modal roughly symmetric particles size distribution.

In a third step, those particles with different equivalent outer diameters corresponding to convenient modes are mixed according the required ratios $RD_k$ and $RN_k$ of neighbouring modes of the skewed multimodal particle size distribution. Hence, said mixture has a skewed multimodal distribution of outer diameters and may form the granular material for forming required strong force-networks within the sound insulation element.

BRIEF DESCRIPTION OF THE DRAWINGS

Further details, embodiments and advantages of the present invention will become apparent from the following detailed description, which is provided by way of example only, with reference to the drawings, wherein.

Hereinafter, preferred embodiments of the present invention will be described with reference to the drawings. The drawings only provide schematic views of the invention. Like reference numerals refer to corresponding parts, elements or components throughout the figures, unless indicated otherwise.

DETAILED DESCRIPTION

Figure 1A:
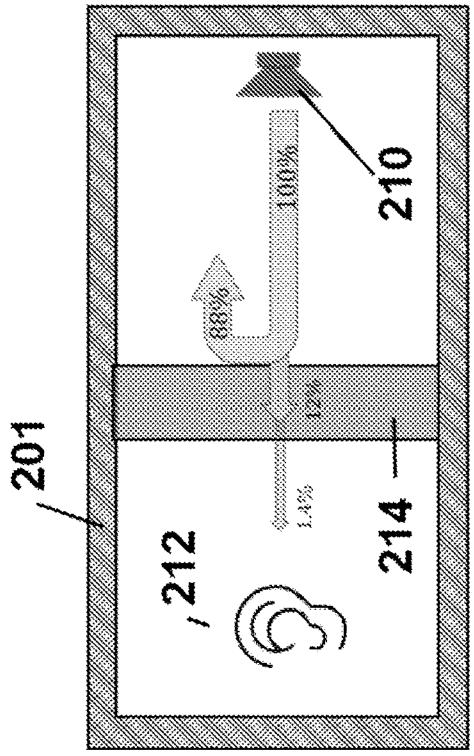
FIG. 1*a* is an exemplary illustration of a first sound transmitting system according to prior art.

FIG. 1*a* is an exemplary illustration of a first sound transmitting system 201 according to prior art. The system 201 comprises a sound emitter 210 in form of a loudspeaker, a sound recipient 212 indicated by a human ear and a separation element 214 separating the sound emitter 210 from the sound recipient 212. The numbers in the illustration are an example how emitted sound waves are reflected by the separation element 214, absorbed by the separation element 214 and transmitted by wave propagation.

In the present case, the separation element 214 is a rigid metallic wall that cannot perform any macroscopic vibrations. Here, about 88% of emitted sound waves are reflected by the separation element 214 and only about 12% of the sound waves enter the separation element 214. The majority of these sound waves are dissipated within the separation element 214 and only about 1.4% of the sound waves are transmitted to the sound recipient 212. This means that a sound transmission loss is about:

$$STL=20\ \log(100/1.4)\approx 37\ \text{dB}$$

Figure 1B:
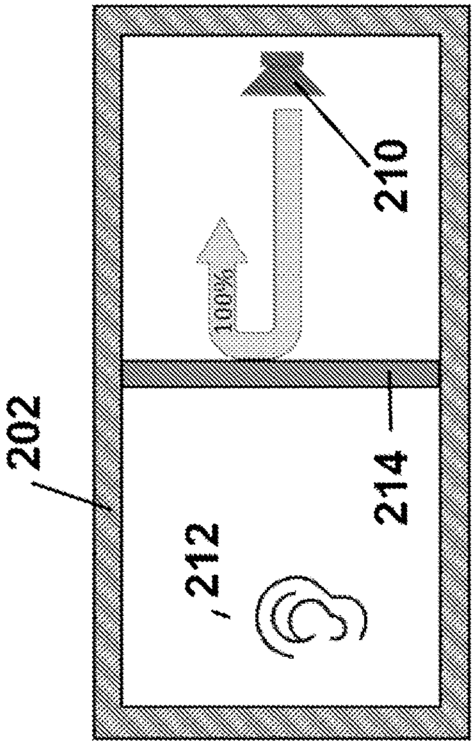
FIG. 1*b* is an exemplary illustration of a hypothetic second sound transmitting system having ideal insulation properties.

FIG. 1*b* is an exemplary illustration of a hypothetic second sound transmitting system 202 having ideal insulation properties. The system 202 comprises a sound emitter 210 in form of a loudspeaker, a sound recipient 212 indicated by a human ear and a separation element 214 separating the sound emitter 210 from the sound recipient 212.

In the present case, the separation element 214 is a wall that is absolutely rigid. That means the modulus of elasticity and the stiffness of the separation element 214 are infinite. In this case, all of the emitted sound waves are reflected by the separation element 214.

Figure 1C:
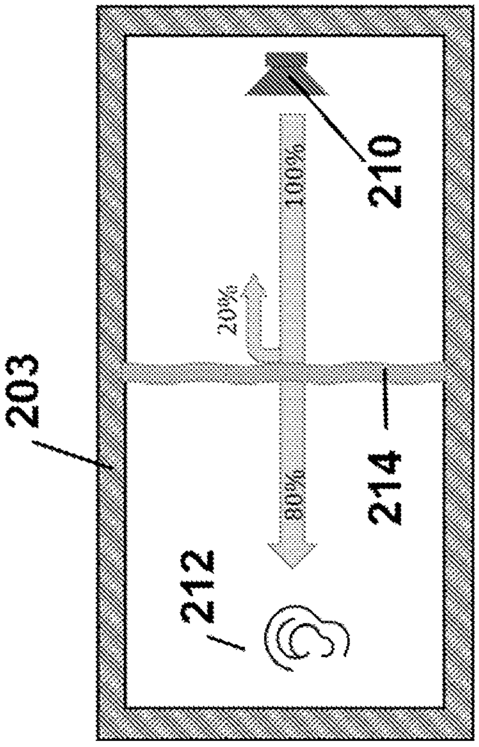
FIG. 1*c* is an exemplary illustration of a third sound transmitting system according to prior art.

FIG. 1*c* is an exemplary illustration of a third sound transmitting system 203 according to prior art. The system 203 comprises a sound emitter 210 in form of a loudspeaker, a sound recipient 212 indicated by a human ear and a separation element 214 separating the sound emitter 210 from the sound recipient 212. The numbers in the illustration are an example how emitted sound waves are reflected by the separation element 214, absorbed by the separation element 214 and transmitted through the separation element 214.

In the present case, the stiffness of the separation element 214 is relatively small. Thereat, a substantial part of about 80% of the energy of the emitted sound waves is transmitted by means of macroscopic vibrations of the separation element 214 and only about 20% of emitted sound waves are reflected by the separation element 214.

Figure 1D:
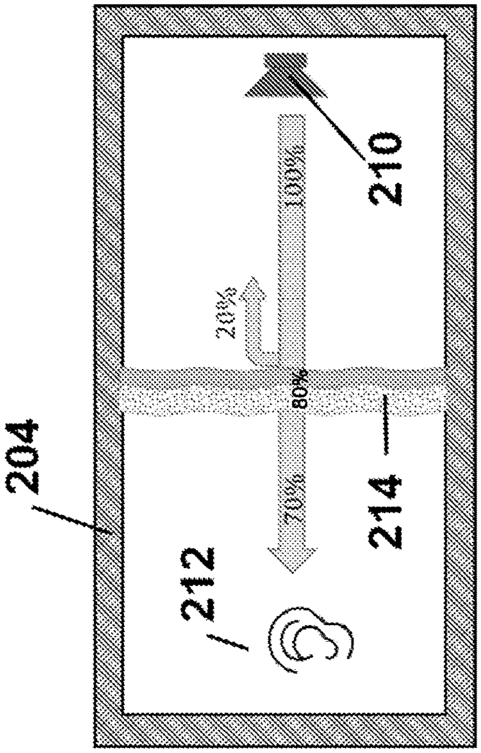
FIG. 1*d* is an exemplary illustration of a fourth sound transmitting system according to prior art.

FIG. 1*d* is an exemplary illustration of a fourth sound transmitting system 204 according to prior art. The system 204 comprises a sound emitter 210 in form of a loudspeaker, a sound recipient 212 indicated by a human ear and a separation element 214 separating the sound emitter 210 from the sound recipient 212. The numbers in the illustration are an example how emitted sound waves are reflected by the separation element 214, absorbed by the separation element 214 and transmitted through the separation element 214.

In the present case, the separation element 214 is an elastic wall with an insulation material fixed thereon, assuring direct contact between the elastic and the insulation material. In this case pressure waves are transmitted directly from the elastic wall into the insulation material through the contact between two solid bodies. In addition, the vibrating elastic wall will also enforce macroscopic vibrations of the insulation material. In this case the separation element 214 essentially acts more as vibration insulation than as sound insulation. Thereat, about 70% of the energy of the emitted sound waves is transmitted through the separation element 214, 10% are dissipated within the separation element 214, and only about 20% of emitted sound waves are reflected by the separation element 214.

Figure 2B:
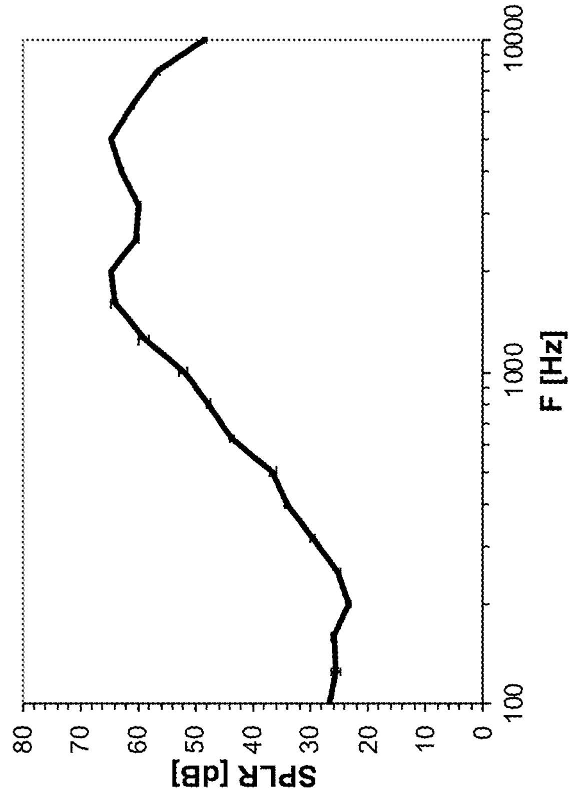
FIG. 2*b* is a graph showing a sound pressure level reduction of an insulation made from the same sawdust with a particle size distribution according to the invention.
Figure 2A:
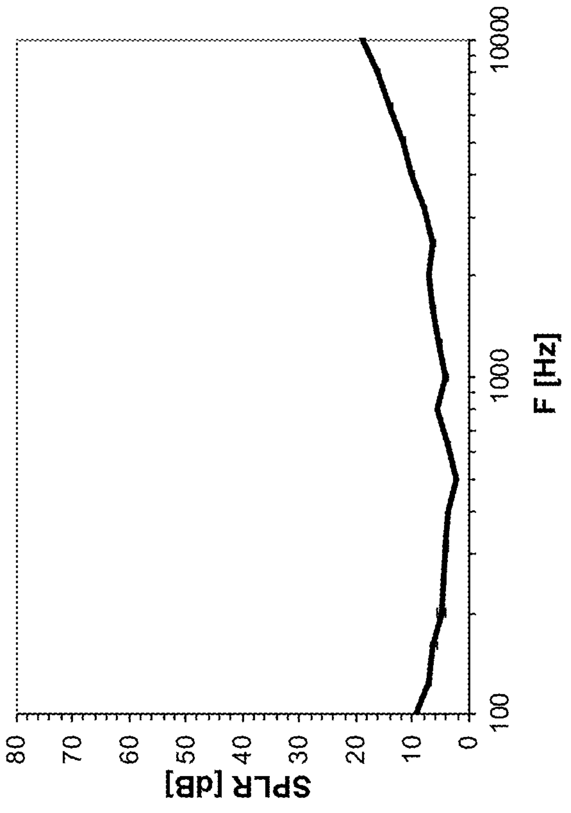
FIG. 2*a* is a graph showing a sound pressure level reduction of an insulation made from sawdust with a common particle size distribution.
Figure 3B:
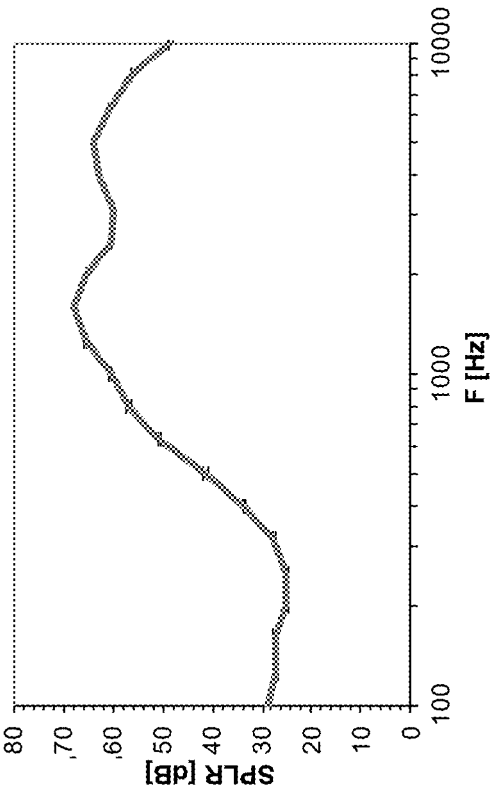
FIG. 3*b* is a graph showing a sound pressure level reduction of an insulation made from LDPE with a particle size distribution according to the invention.
Figure 3A:
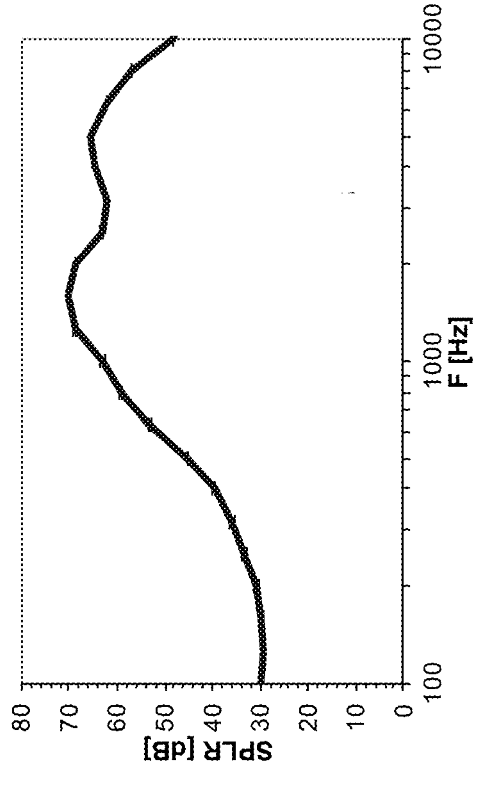
FIG. 3*a* is a graph showing a sound pressure level reduction of an insulation made from rubber with a particle size distribution according to the invention.
Figure 3D:
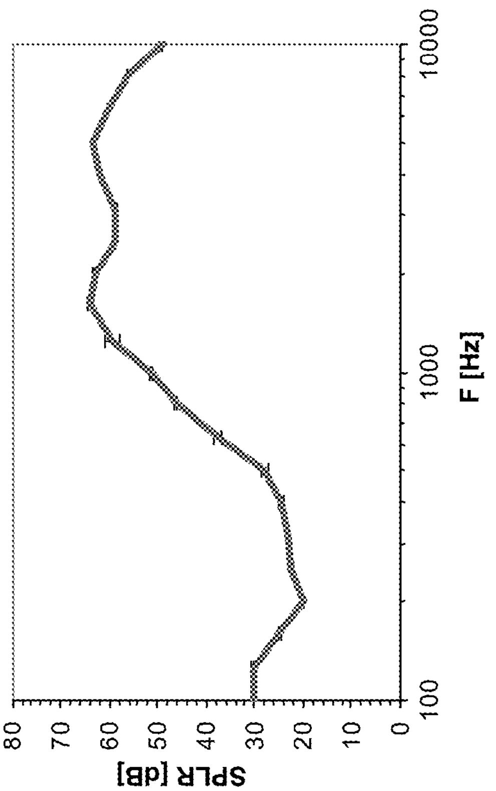
FIG. 3*d* is a graph showing a sound pressure level reduction of an insulation made from PMMA with a particle size distribution according to the invention.
Figure 3C:
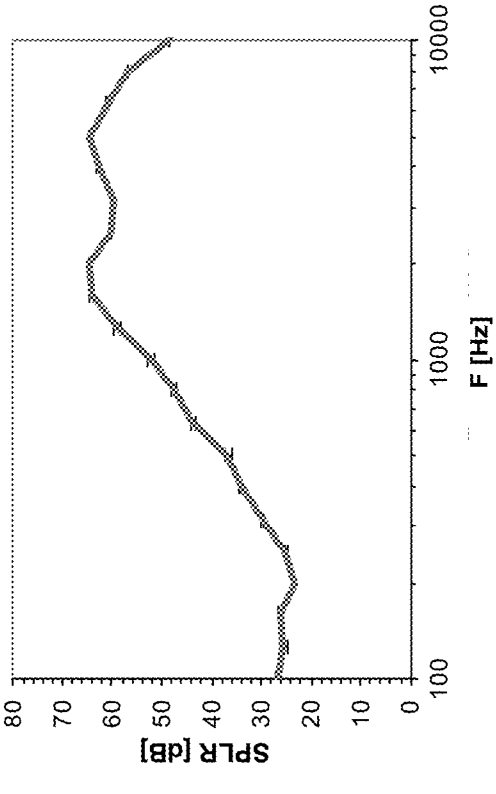
FIG. 3*c* is a graph showing a sound pressure level reduction of an insulation made from wood sawdust with a particle size distribution according to the invention.
Figure 4A:
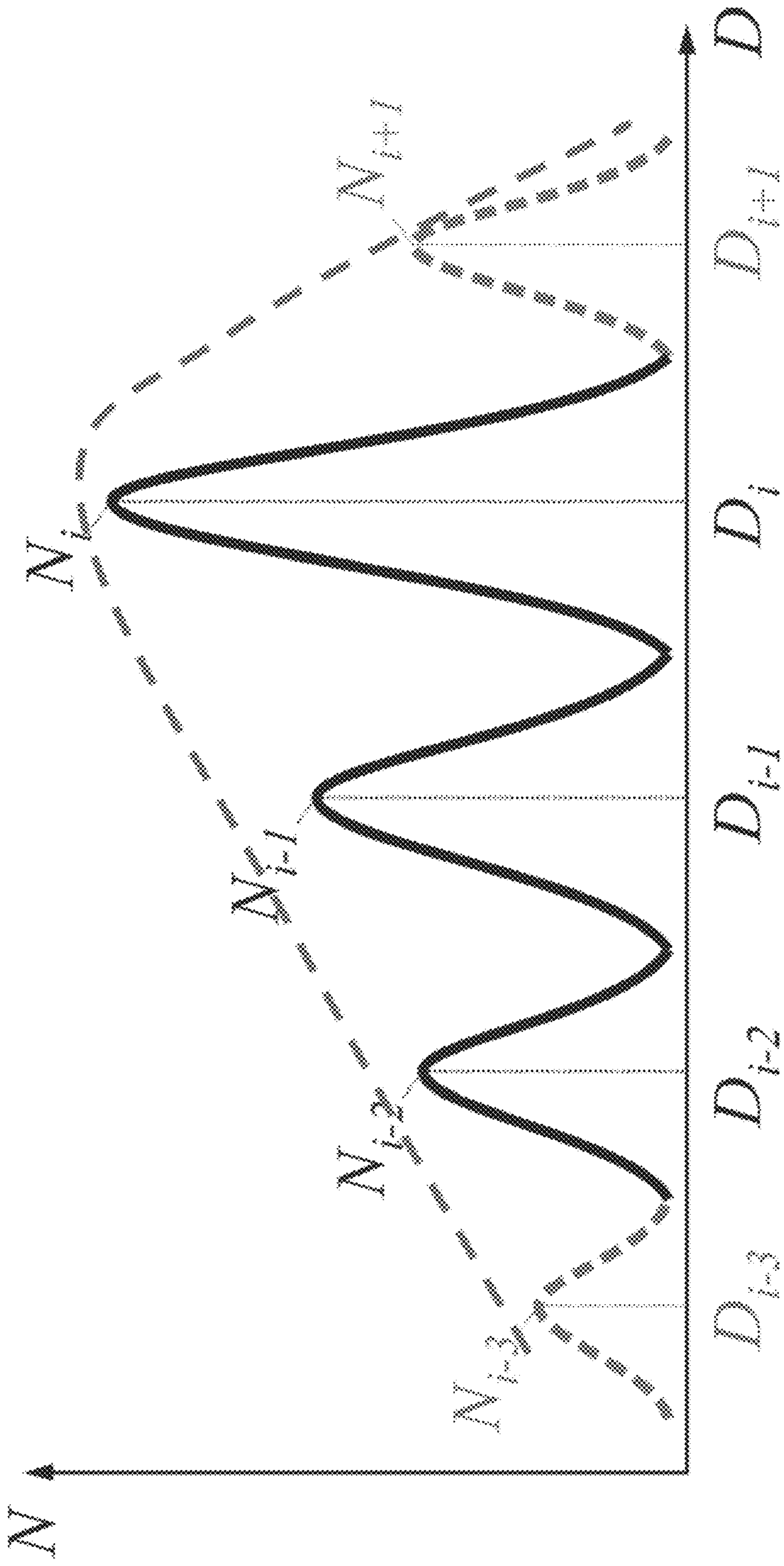
FIG. 4*a* is a schematic illustration of an equivalent outer diameter distribution with a negatively skewed multimodality section.
Figure 4B:
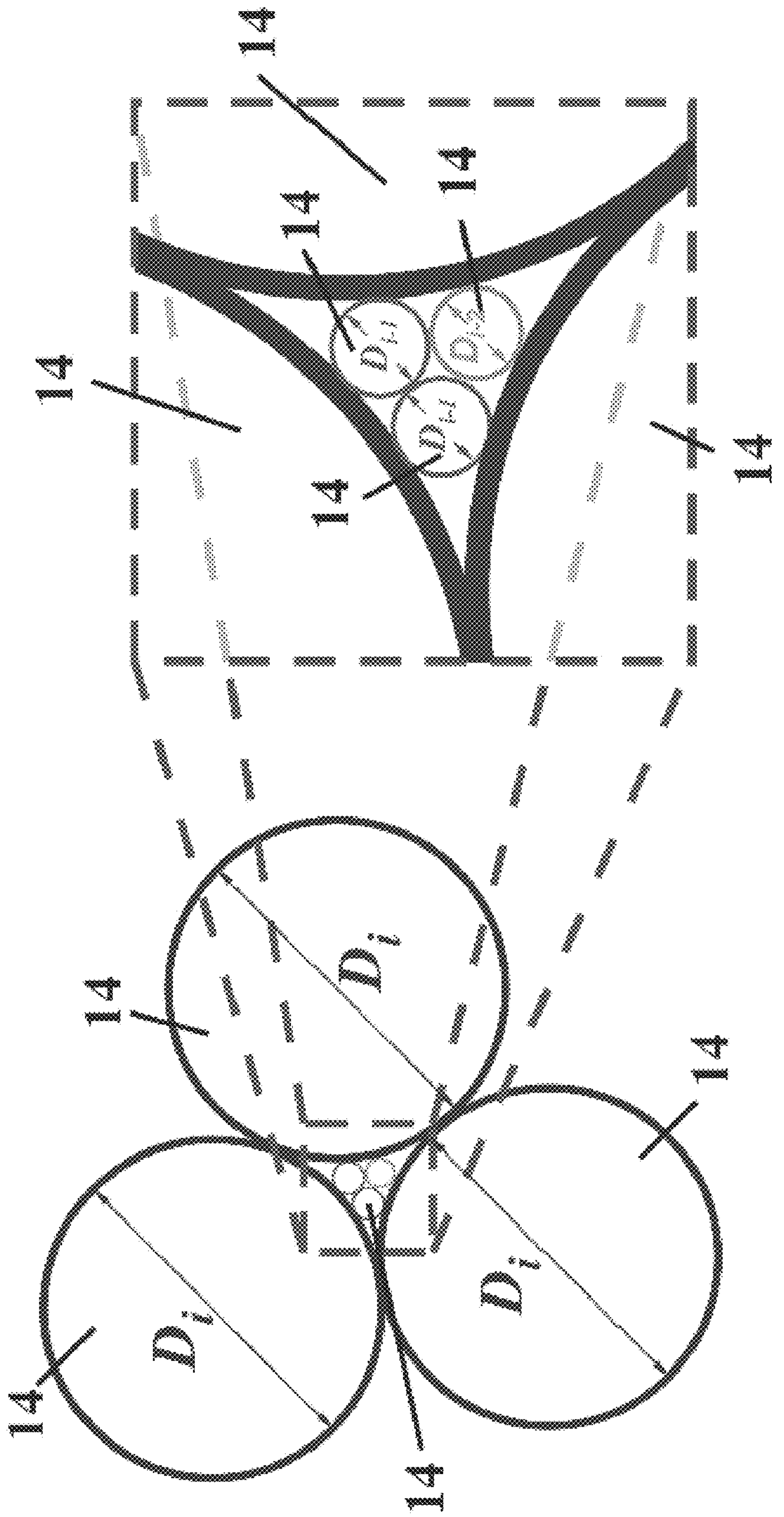
FIG. 4*b* is a schematic illustration of a possible arrangement of particles having an outer diameter distribution according to FIG. 4*a* with an augmented area.
Figure 4C:
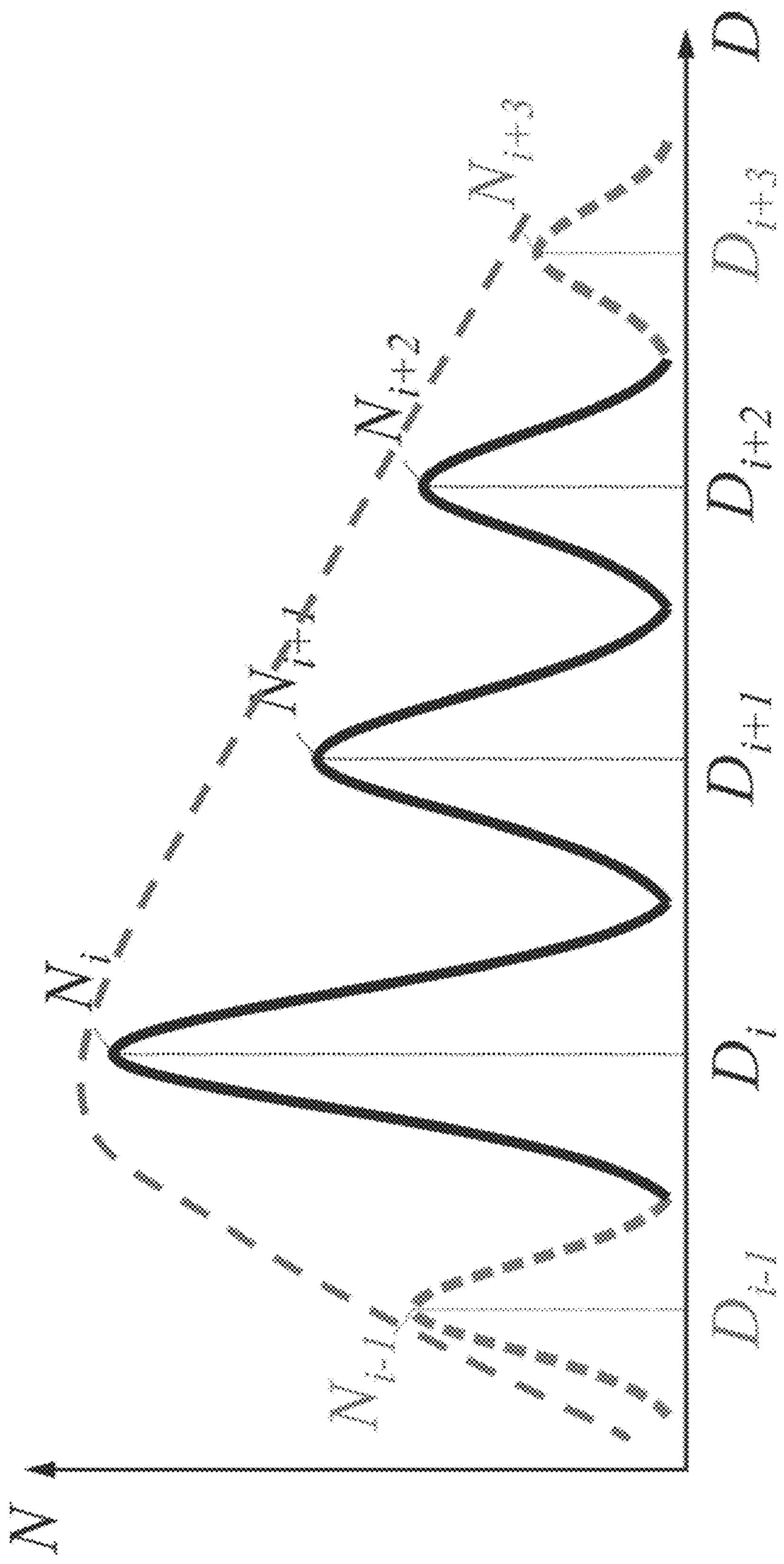
FIG. 4*c* is a schematic illustration of an equivalent outer diameter distribution with a positively skewed multimodality section.
Figure 4D:
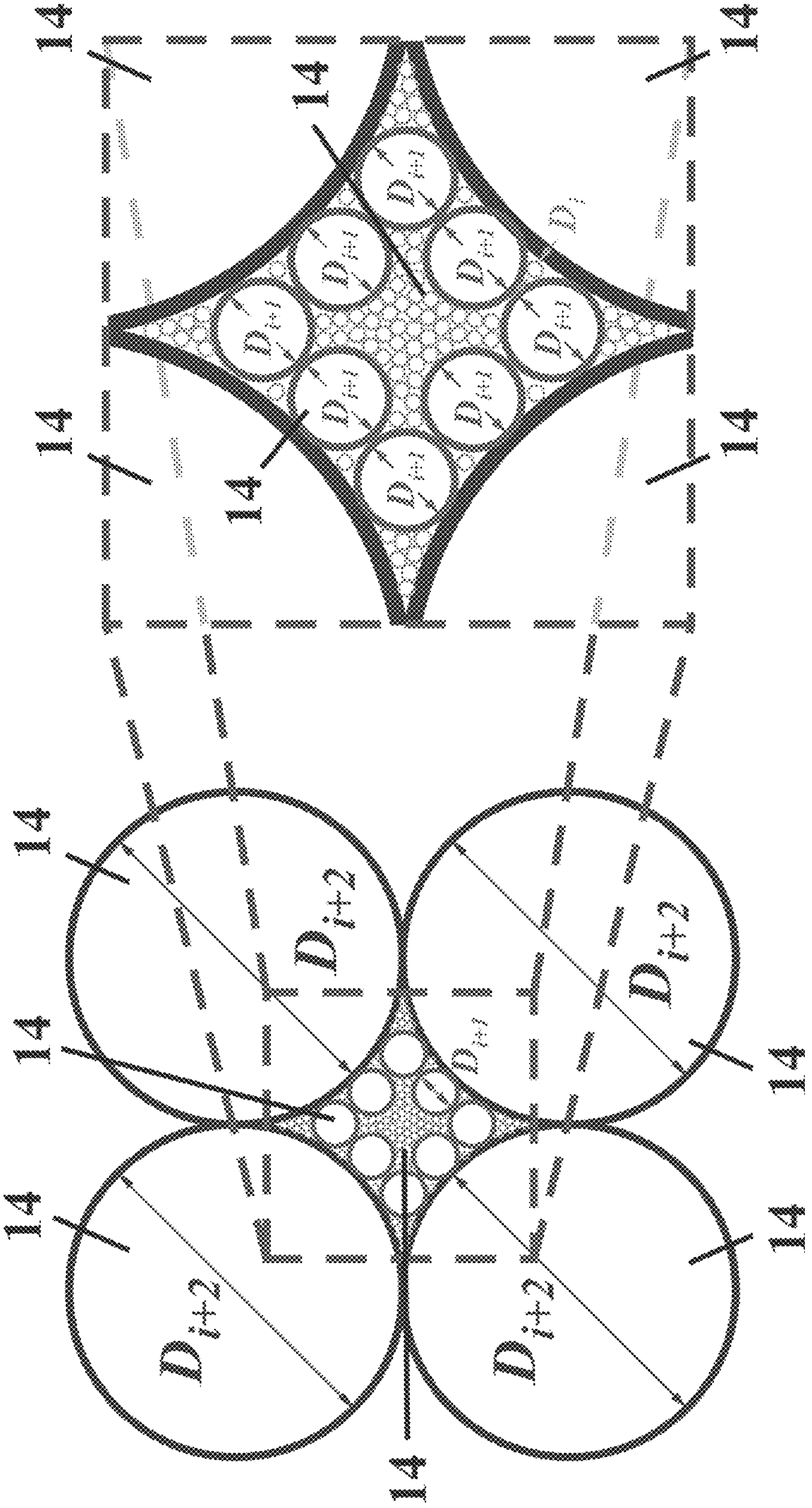
FIG. 4*d* is a schematic illustration of a possible arrangement of particles having an outer diameter distribution according to FIG. 4*c* with an augmented area.

FIG. 2 is an exemplary comparison of the measured sound pressure level reduction SPLR of an insulation made from sawdust. Thereat, FIG. 2*a* is a graph showing the sound pressure level reduction SPLR against a frequency F of an insulation made from sawdust with a common particle size distribution. FIG. 2*b* is a graph showing a sound pressure level reduction SPLR against a frequency F of an insulation made from the same sawdust with a particle size distribution that is adjusted according to the invention.

FIG. 3 is an exemplary demonstration that the performance of the new Strong Force-Network sound insulation is material independent. FIG. 3 presents a comparison of four insulations made from different granulated materials. FIG. 3*a* is a graph showing a sound pressure level reduction SPLR against a frequency F of an insulation made from waste tires rubber with a particle size distribution that is adjusted according to the invention. FIG. 3*b* is a graph showing a sound pressure level reduction SPLR against a frequency F of an insulation made from LDPE (low-density polyethylene) with a particle size distribution that is adjusted according to the invention. FIG. 3*c* is a graph showing a sound pressure level reduction SPLR against a frequency F of an insulation made from wood sawdust with a particle size distribution that is adjusted according to the invention.

FIG. 3$d$ is a graph showing a sound pressure level reduction SPLR against a frequency F of an insulation made from PMMA (Polymethyl methacrylate) with a particle size distribution that is adjusted according to the invention. All four insulations show almost identical performance.

FIG. 4$a$ is a schematic illustration of an equivalent outer diameter distribution with a negatively skewed multimodality section. The negatively skewed section of the multimodal distribution has one maximum mode i having a maximum number $N_i$ of particles 14 assigned to a fundamental equivalent outer diameter $D_i$ of particles 14.

The negatively skewed multimodality section of the multimodal distribution has a preceding mode i−1 having a preceding number $N_{i-1}$ of particles assigned to a preceding equivalent outer diameter $D_{i-1}$ of particles 14 and another mode having a number $N_{i-2}$ of particles 14 assigned to an equivalent outer diameter $D_{i-2}$ of particles 14 and another mode having a number $N_{i-3}$ of particles 14 assigned to an equivalent outer diameter $D_{i-3}$ of particles 14. Thereat, the number of particles $N_k$ assigned to the equivalent outer diameter $D_k$ of the modes is rising with rising equivalent outer diameter $D_k$:

$$D_k > D_{k-1} \text{ and } N_k > N_{k-1} \text{ for } k \le i$$

Presently, within said multimodality section which is negatively skewed, a ratio $RD_k$ between an equivalent outer diameter $D_k$ of an elected mode k, and an equivalent outer diameter $D_{k-1}$ of an adjacent mode k−1 is equal to (1+√5)/2 or to any integer multiple of said value:

$$RD_k = D_k / D_{k-1} = n^*(1+\sqrt{5})/2 \text{ with } n = \text{integer}$$

Presently, within said multimodality section which is negatively skewed, a ratio $RN_k$ between a number $N_k$ of an elected mode k, and a number $N_{k-1}$ of an adjacent mode k−1 is equal to (1+√5)/2 or to any integer multiple of said value.

$$RN_k = N_k / N_{k-1} = n^*(1+\sqrt{5})/2 \text{ with } n = \text{integer}$$

The multimodal distribution further has a subsequent mode i+1 having a subsequent number $N_{i+1}$ of particles 14 assigned to a subsequent equivalent outer diameter $D_{i+1}$ of particles 14. Said subsequent mode i+1 however is not part of the negatively skewed multimodality section of the multimodal distribution.

FIG. 4$b$ is a schematic illustration of a possible arrangement of particles 14 having an outer diameter distribution according to FIG. 4$a$ with an augmented area. For the purpose of easier presentation, the particles 14 are shown as regular balls with spherical geometry.

Currently, three particles 14 having the maximum diameter $D_i$ of the maximum mode are arranged such that they touch each other and leave an interspace in between. Two particles 14 having the preceding diameter $D_{i-1}$ of the preceding mode i−1 are arranged within said interspace as well as one particle having the diameter $D_{i-2}$ of the adjacent mode.

FIG. 4$c$ is a schematic illustration of an equivalent outer diameter distribution with a positively skewed multimodality section. The positively skewed section of the multimodal distribution has one maximum mode i having a maximum number $N_i$ of particles 14 assigned to a fundamental equivalent outer diameter $D_i$ of particles 14.

The positively skewed multimodality section of the multimodal distribution has a subsequent mode i+1 having a subsequent number $N_{i+1}$ of particles 14 assigned to a subsequent equivalent outer diameter $D_{i+1}$ of particles 14 and another mode having a number $N_{i+2}$ of particles 14 assigned to an equivalent outer diameter $D_{i+2}$ of particles 14 and another mode having a number $N_{i+3}$ of particles 14 assigned to an equivalent outer diameter $D_{i+3}$ of particles 14. Thereat, the number of particles $N_k$ assigned to the equivalent outer diameter $D_k$ of the modes is falling with rising equivalent outer diameter $D_k$:

$$D_k > D_{k+1} \text{ and } N_k > N_{k+1} \text{ for } k \ge i$$

Presently, within said multimodality section which is positively skewed, a ratio $RD_k$ between an equivalent outer diameter $D_k$ of an elected mode k, and an equivalent outer diameter $D_{k+1}$ of an adjacent mode k+1 is equal to (1+√5)/2 or to any integer divider of said value:

$$RD_k = D_k / D_{k+1} = 2/(n^*(1+\sqrt{5})) \text{ with } n = \text{integer}$$

Presently, within said multimodality section which is positively skewed, a ratio $RN_k$ between a number $N_k$ of an elected mode k, and a number $N_{k+1}$ of an adjacent mode k+1 is equal to (1+√5)/2 or to any integer multiple of said value.

$$RN_k = N_k / N_{k+1} = n^*(1+\sqrt{5})/2 \text{ with } n = \text{integer}$$

The multimodal distribution further has a preceding mode i−1 having a preceding number $N_{i-1}$ of particles 14 assigned to a preceding equivalent outer diameter Do of particles 14. Said preceding mode i−1 however is not part of the positively skewed multimodality section of the multimodal distribution.

FIG. 4$d$ is a schematic illustration of a possible arrangement of particles 14 having an outer diameter distribution according to FIG. 4$c$ with an augmented area. For the purpose of easier presentation, the particles 14 are shown as regular balls with spherical geometry.

Currently, four particles 14 having the diameter $D_{i+2}$ of the mode adjacent to the subsequent mode i+1 adjacent to the maximum mode i are arranged such that they touch each other and leave an interspace in between. Several particles 14 having the subsequent diameter $D_{i+1}$ of the subsequent mode i+1 adjacent to the maximum mode i are arranged within said interspace as well as several particles having the fundamental diameter $D_i$ of the maximum mode i.

Figure 5:
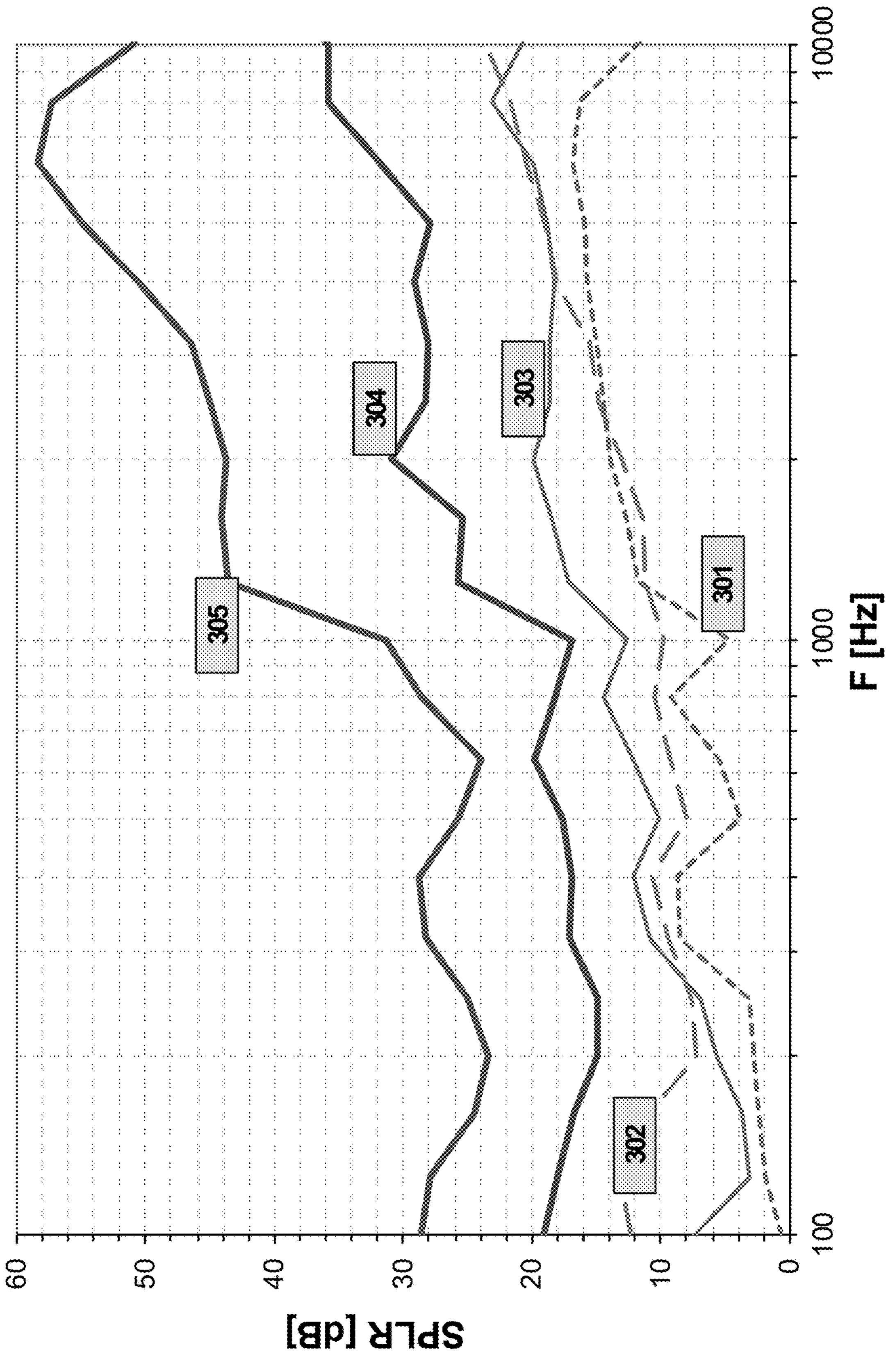
FIG. 5 is a graph showing frequency dependence of a sound pressure level reduction of insulations made from different common insulation materials compared with an insulation made of a material with a particle size distribution according to the invention.

FIG. 5 is a graph showing a sound pressure level reduction SPLR against a frequency F of insulations made from different materials with a common particle size distribution compared with an insulation made of a material 305 with a particle size distribution according to the invention. Thereat, graphs for Styropor 301, Stonewool 302, Styrodur 303 and a high-end commercial sound insulation material called “FAI30M” 304 are given.

FIG. 5 is an exemplary comparison of measurements of the new strong force-network forming insulation compared to the typical commercial insulations. In the present case the new strong force-network based insulation outperforms the existing insulation for several orders of magnitude. In particular the improvement of sound insulation at lower frequencies in reduction of sound wave pressure is at least three times whereas at higher frequencies, above 3000 Hz, the improvement is more than ten times. The sound wave pressure p is calculated as $$p = p_0 * 10^{(SPLR/20)} [Pa]$$

Thereat, $p_0$ is a reference sound wave pressure and SPLR is the measured sound pressure level reduction.

Figure 6:
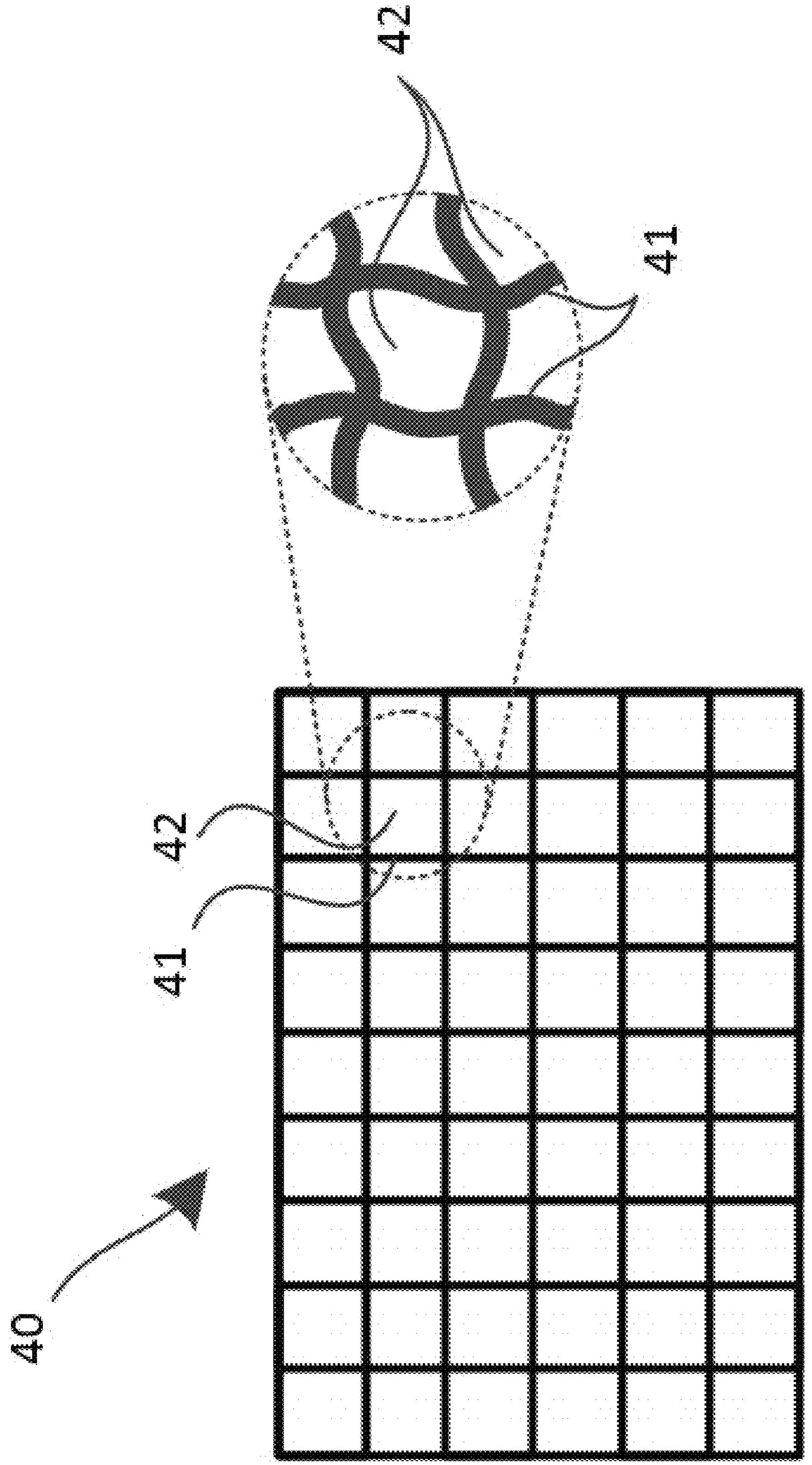
FIG. 6 is a schematic illustration of a supporting structure with an augmented detail.

FIG. 6 is a schematic illustration of a possible supporting structure 40 with an augmented detail. The supporting structure 40 comprises walls 41 that surround cavities 42. In the given illustration, the walls 41 are almost straight having slight curves, whereat the walls 41 are arranged regularly. In particular, in the given presentation the walls 41 are arranged parallel, respectively orthogonal to one another, and the cavities 42 have an almost rectangular shape and each cavity 42 is surrounded by at least four walls 41. The cavities 42 may be surrounded additionally by a top wall and a bottom wall that are not shown in this illustration.

However, the walls 41 of the supporting structure may also be arranged irregular and asymmetric. Hence, the cavities 42 of the supporting structure 40 also may have an irregular shape. Furthermore, the cavities 42 may have, for example, a spherical shape.

Figure 7:
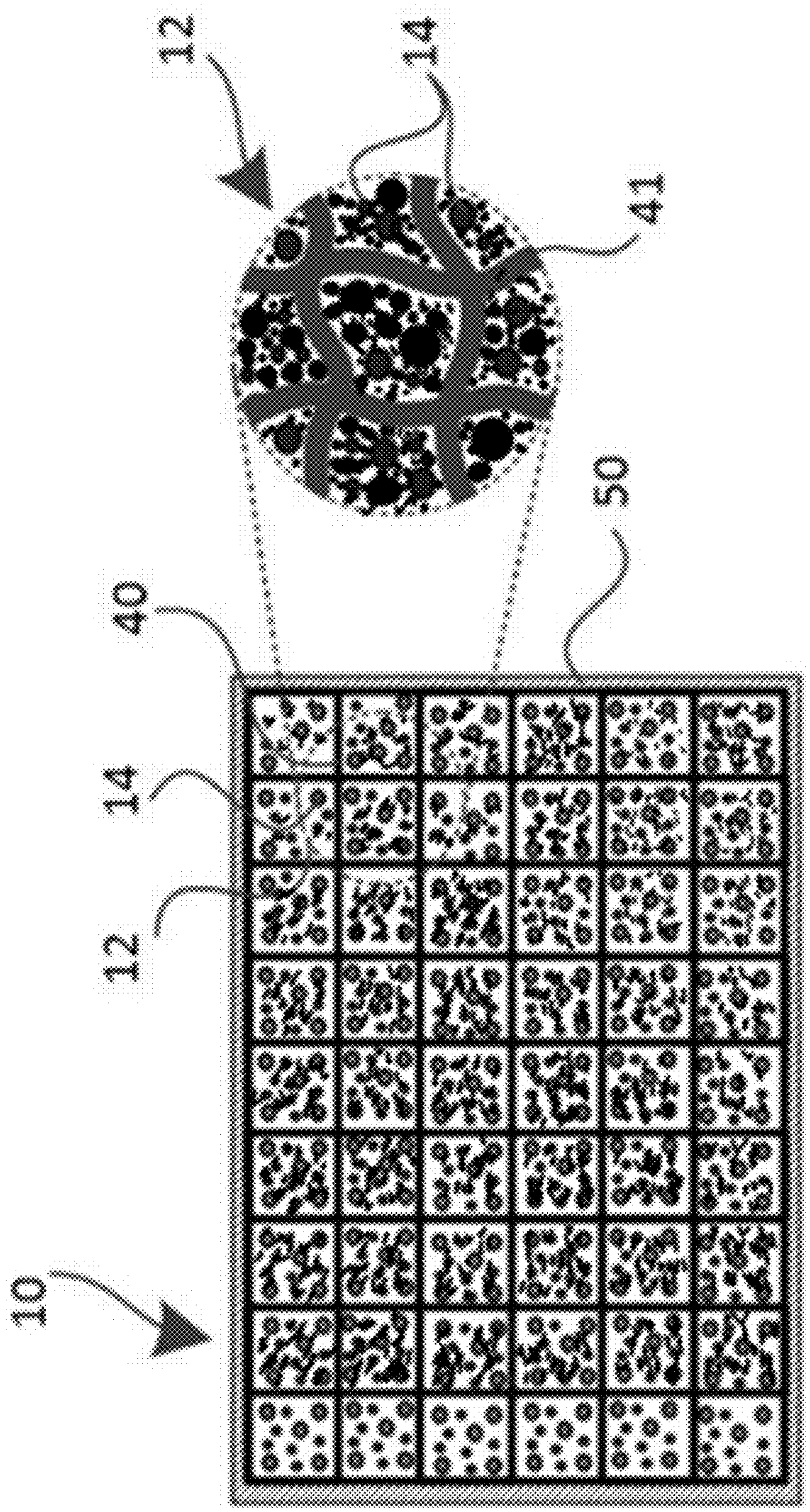
FIG. 7 is a schematic sectional view at a sound insulation element with an augmented detail.

FIG. 7 is a schematic sectional view at a sound insulation element 10 with an augmented detail. The sound insulation element 10 comprises the supporting structure 40 shown in FIG. 6, whereat the cavities 42 of said supporting structure 40 are filled with a granular material 12. The granular material 12 of the sound insulation element 10 contains granular particles 14. As can be seen, in particular in the augmented detail, the particles 14 have different size and thus have different equivalent outer diameters D. The equivalent outer diameters D and respective numbers N of the granular particles 14 need to be in proper ratio to ensure a desired size of a dissipative strong force-network. For the sake of visibility, the shown cavities are not fully filled with particles.

In principle, the supporting structure 40 may assume any structural form providing that it keeps the granular particles 14 of the granular material 12 in a desired position in space and allows complex interactions of the granular particles 14 to from a strong force-network.

The supporting structure 40 is covered by a cover 50 that is only partly visible in the given presentation. The cover 50 prevents the granular particles 14 of the granular material 12 from falling off the cavities 42 of the supporting structure 40. The cover 50 also prevents dirt or humidity from entering the cavities 42 of the supporting structure 40 and thus from getting in contact with the particles 14 of the granular material 12.

In the present case, the cover 50 is non-porous. In other embodiments of the invention, the cover 50 may be made of a porous material having pores with an equivalent pore diameter which is smaller than the equivalent outer diameter D of the smallest granular particles 14. In such an arrangement, the sound waves will penetrate into the insulation structure and substantially reduce the sound waves reflection. Such insulation will exhibit superb sound absorption and sound insulation characteristics.

Figure 8A:
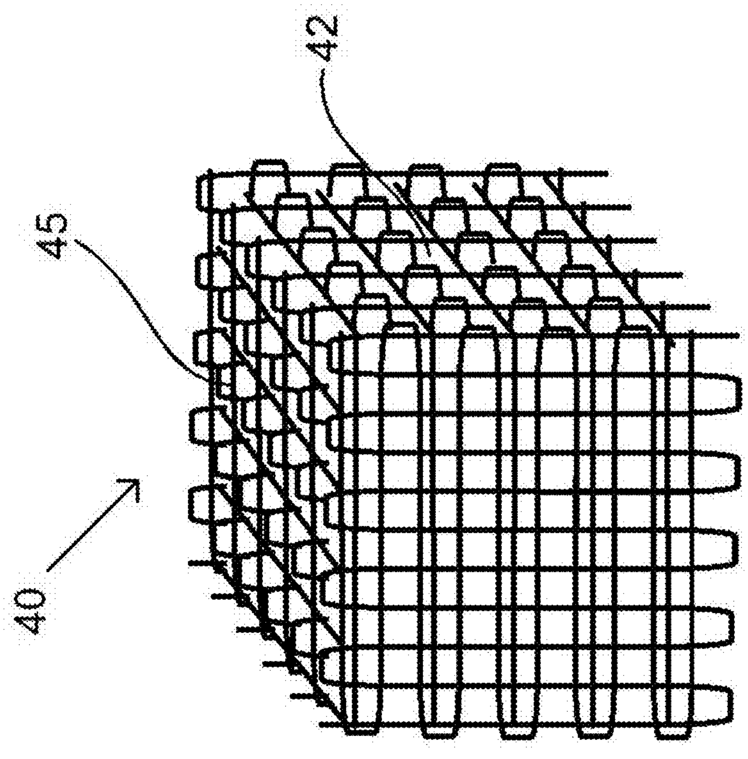
FIGS. 8*a* and 8*b* are schematic illustrations of supporting structures made of woven fabric, respectively non-woven fabric.

FIG. 8*a* is a schematic illustration of a supporting structure 40 made of woven fabric 45. Said supporting structure 40 is designed as a three-dimensional net having an almost regular shape. Within the supporting structure 40 and surrounded by the woven fabric 45, a plurality of cavities 42 are included for reception of granular particles 14.

Figure 8B:
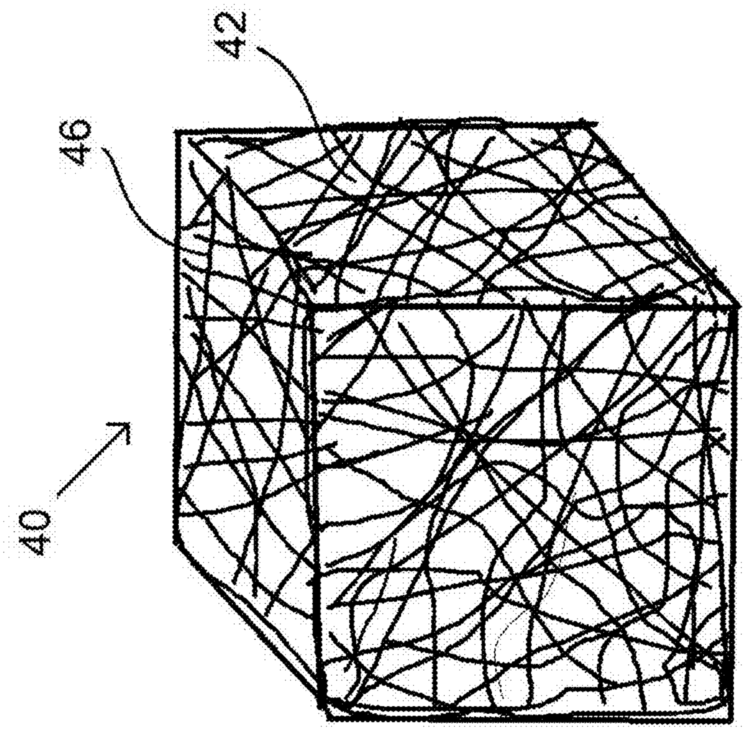

FIG. 8*b* is a schematic illustration of a supporting structure 40 made of non-woven fabric 46. Said supporting structure 40 is designed as a three-dimensional net having an irregular shape. Within the supporting structure 40 and surrounded by the non-woven fabric 46, a plurality of cavities 42 are included for reception of granular particles 14.

Figure 9:
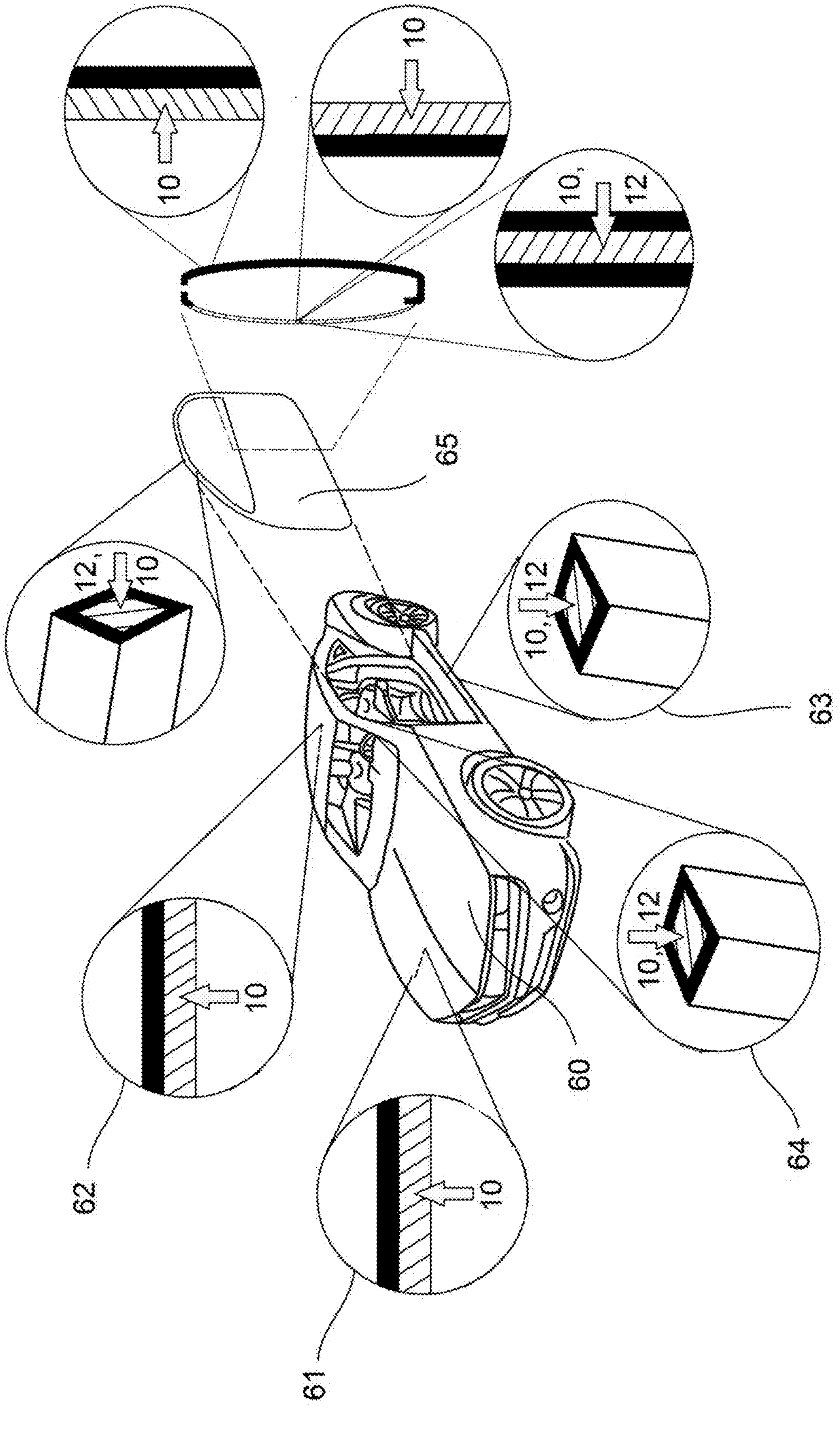
FIG. 9 is a passenger car with augmented details.

FIG. 9 shows a passenger car 60 with sectional views of augmented details of several parts that can be fitted with sound insulation elements 10. Said parts comprise inter alia an engine bonnet 61, a roof structure 62, a sillboard 63, a pillar 64 or a door 65.

A sound insulation element 10 used on the engine bonnet 61 to reduce noise of a combustion engine is preferably created temperature resistant. Alternatively, or additionally, the sound insulation element 10 can be placed directly on the combustion engine.

Structural elements of the passenger car 60 that are hollow, for example sillboards 63, pillars 64 or parts of doors 65 can alternatively be filled with particles 14 of the granular material 12 directly without supplying an explicit supporting structure 40 having a porous composition.

Figure 10:
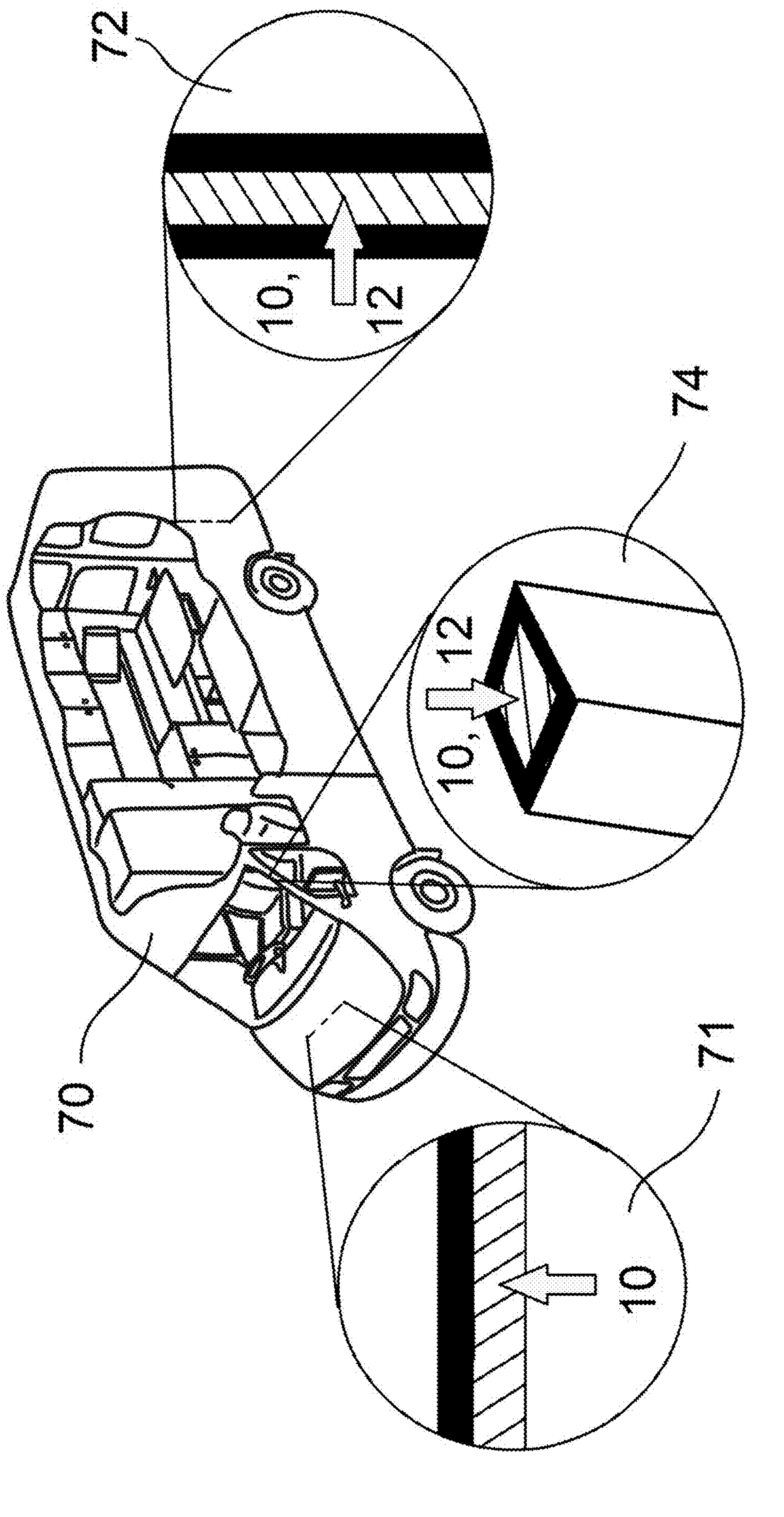
FIG. 10 is a mobile home car with augmented details.

FIG. 10 shows a mobile home car 70 with sectional views of augmented details of several parts that can be fitted with sound insulation elements 10. Said parts comprise inter alia an engine bonnet 71, a pillar 74 or side walls 72 surrounding a living cabin.

A sound insulation element 10 used on the engine bonnet 61 to reduce noise of a combustion engine is preferably created temperature resistant. Alternatively, or additionally, the sound insulation element 10 can be placed directly on the combustion engine.

Structural elements of the mobile home car 70 that are hollow, for example pillars 64 or side walls 72 can alternatively be filled with particles 14 of the granular material 12 directly without supplying an explicit supporting structure 40 having a porous composition.

Figure 11:
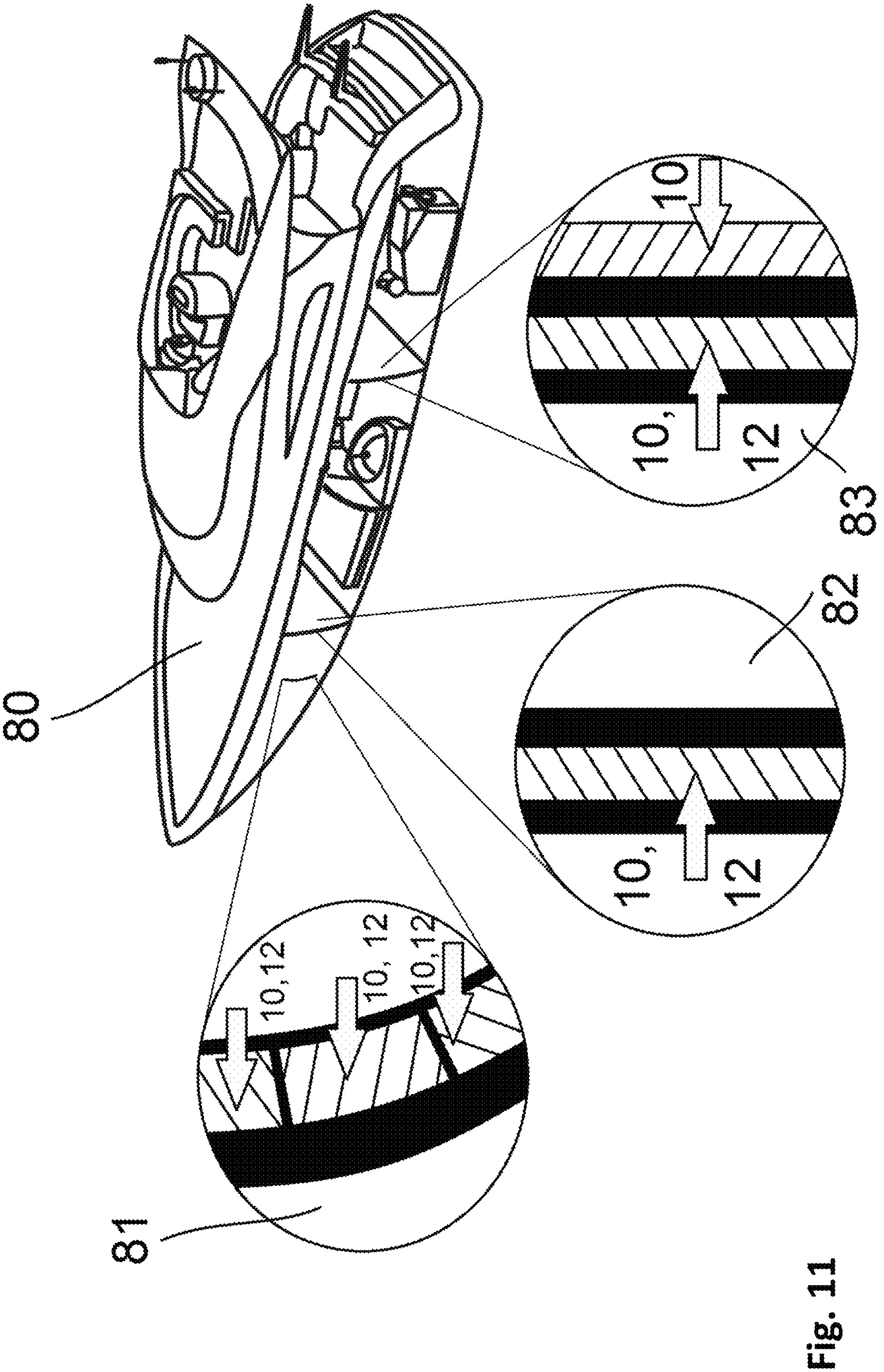
FIG. 11 is a boat with augmented details.

FIG. 11 shows a boat 80 with sectional views of augmented details of several parts that can be fitted with sound insulation elements 10. Said parts comprise inter alia an outside wall 81, inside walls 82 surrounding a living cabin or separating walls 83 dividing a combustion engine compartment or a gearbox from the living cabin.

A sound insulation element 10 used on the separating walls 83 is preferably created temperature resistant. Alternatively, or additionally, the sound insulation element 10 can be placed directly on the combustion engine compartment or on the gearbox.

Structural elements of the boat 80 that are hollow, for example segments of the outside wall 81 or inside walls 82 can alternatively be filled with particles 14 of the granular material 12 directly without supplying an explicit supporting structure 40 having a porous composition. It is also possible to fill a hollow space of a structural element, for example of a separating wall 83, with particles 14 of the granular material 12 directly and to place a sound insulation element 10 additionally onto said structural element.

Figure 12:
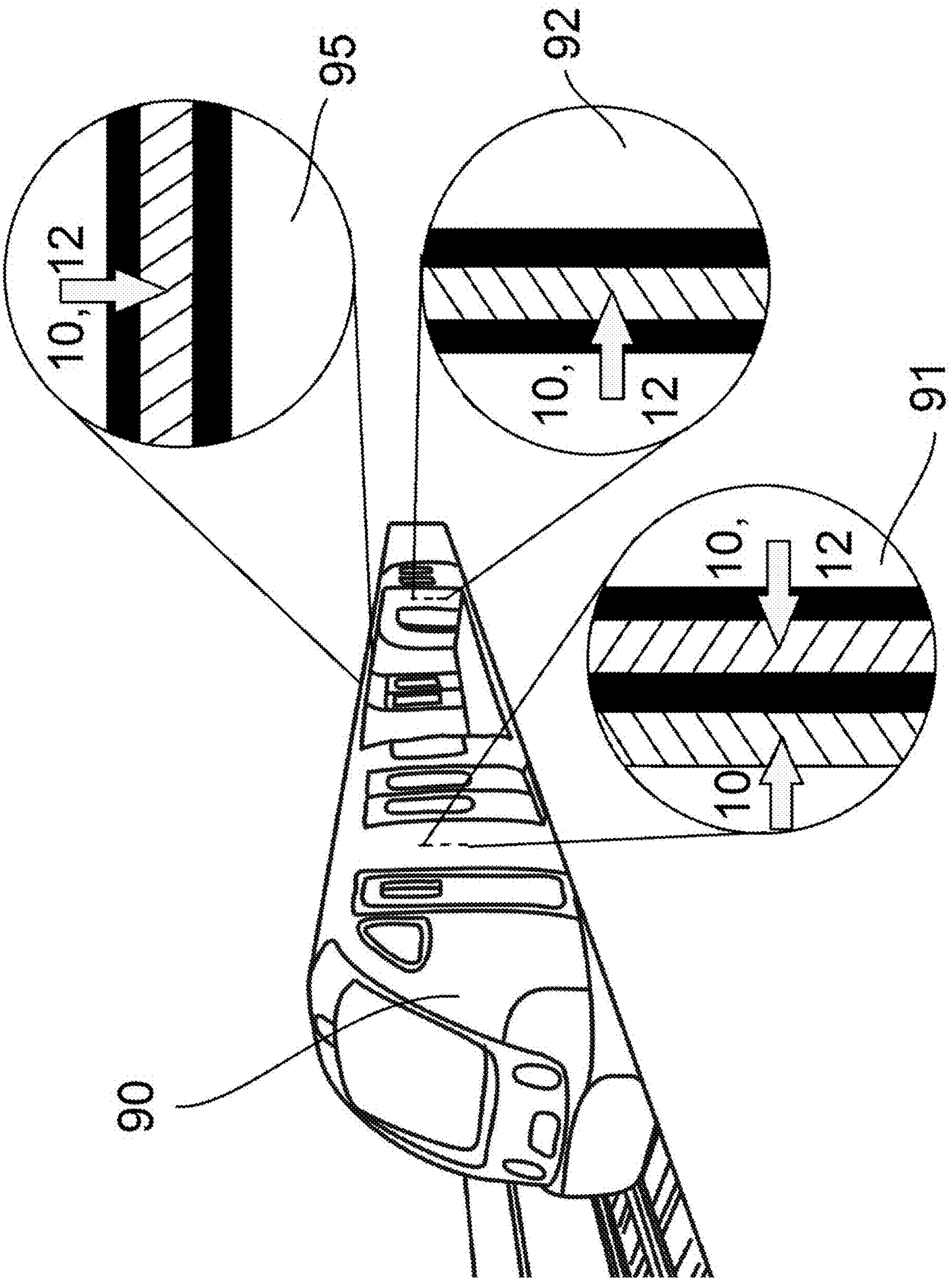
FIG. 12 is a train with augmented details.

FIG. 12 shows a train 90 with sectional views of augmented details of several parts that can be fitted with sound insulation elements 10. Said parts comprise inter alia outside walls 91, inside walls 92 or roof structures 95.

Structural elements of the train 90 that are hollow can alternatively be filled with particles 14 of the granular material 12 directly without supplying an explicit supporting structure 40 having a porous composition. It is also possible to fill a hollow space of a structural element, for example of an outside wall 91, with particles 14 of the granular material 12 directly and to place a sound insulation element 10 additionally onto said structural element.

Figure 13:
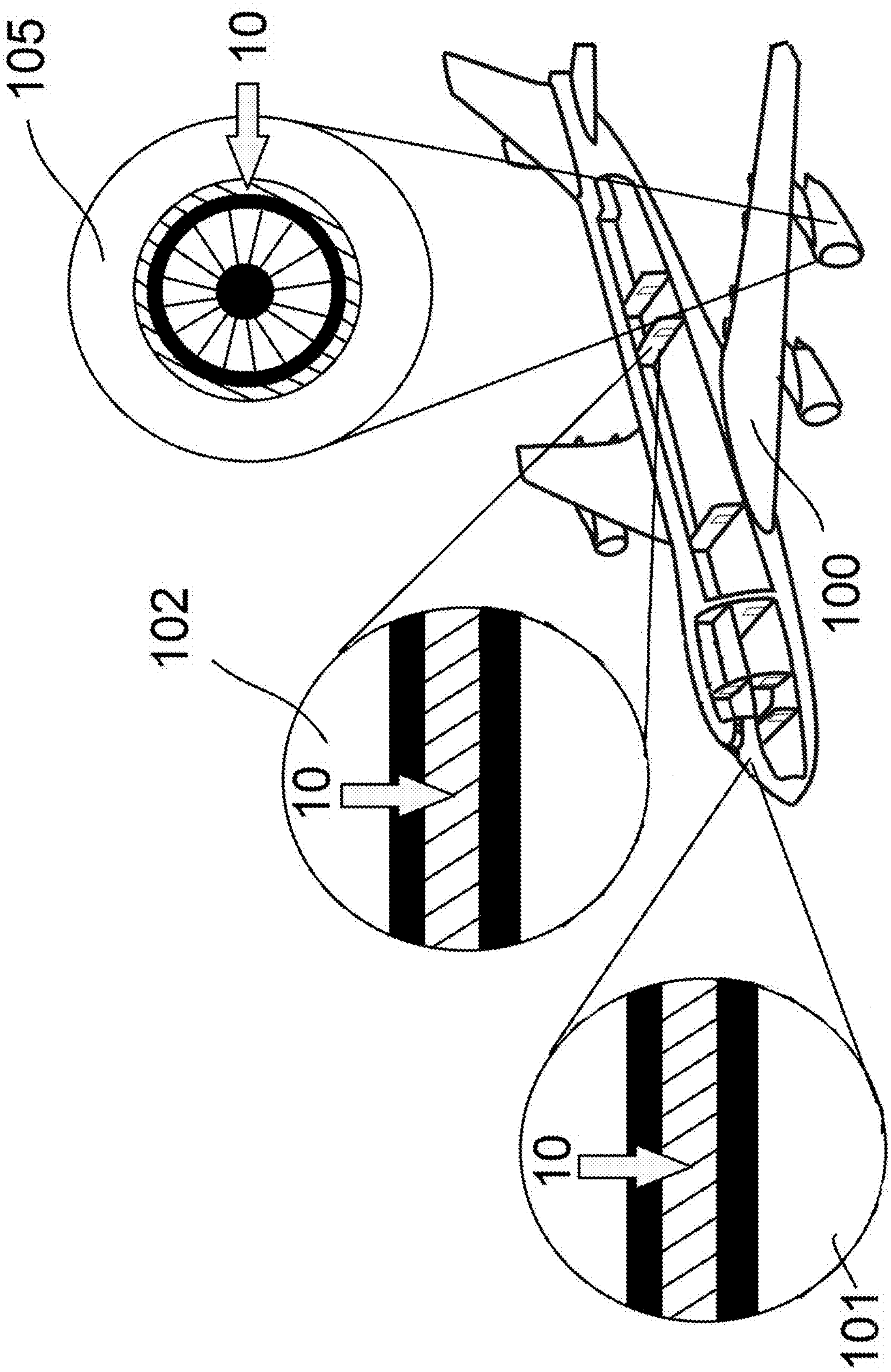
FIG. 13 is an airplane with augmented details.

FIG. 13 shows an airplane 100 with sectional views of augmented details of several parts that can be fitted with sound insulation elements 10. Said parts comprise inter alia outside walls 101, inside walls 102 dividing compartments of the airplane 100 or a turbine engine 105.

A sound insulation element 10 used on the turbine engine 105 is preferably created high-temperature resistant, resisting high temperatures of up to 2000 C°. Preferably, the sound insulation element 10 is placed directly on the turbine engine 105. Thereat, the sound insulation element 10 surrounds the turbine engine 105 like a cylindrical shell fitting the geometry of the turbine engine 105, whereat a front end and a back end remain open.

Figure 14:
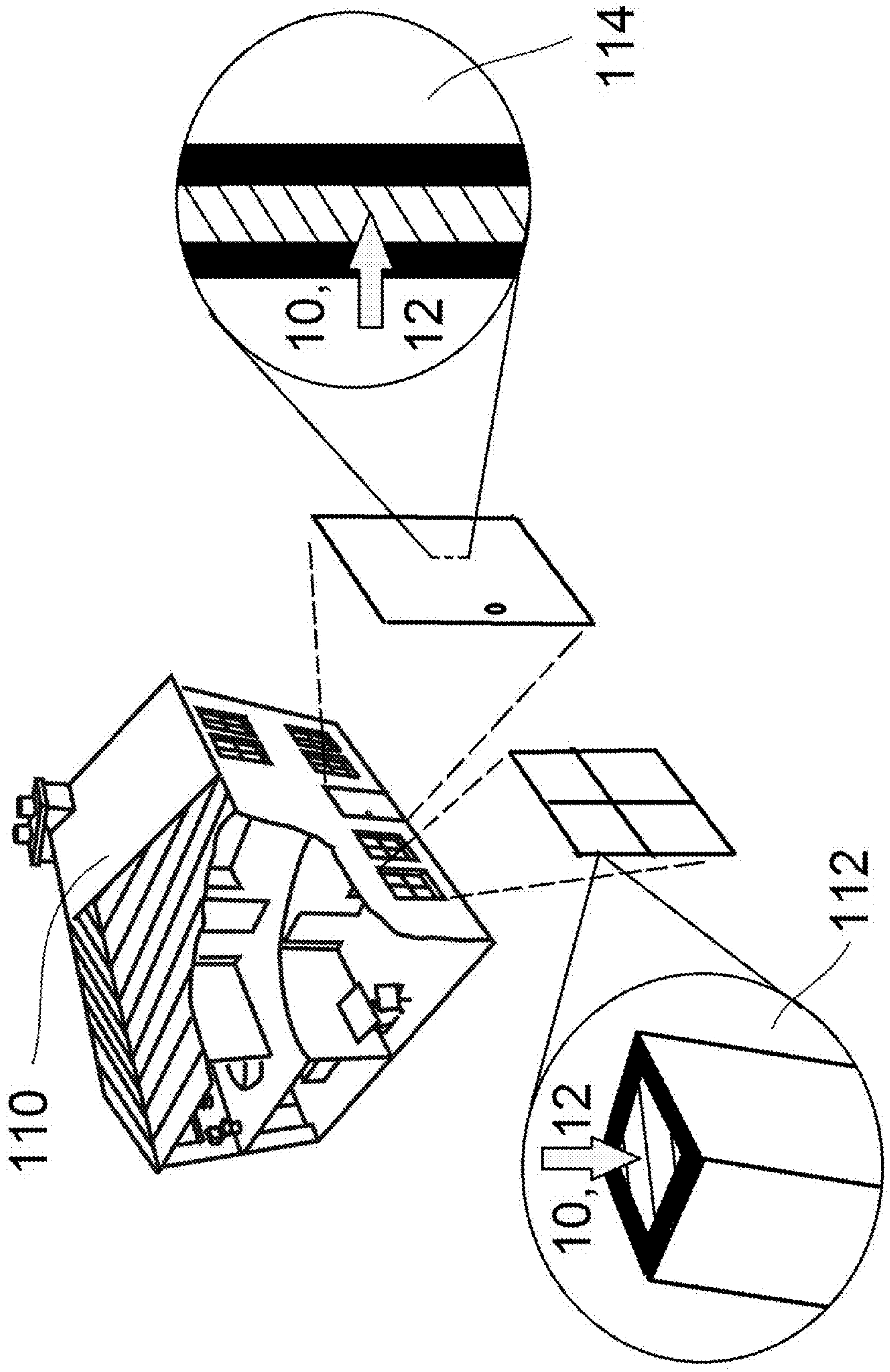
FIG. 14 is a residential house with augmented details.

FIG. 14 shows a residential house 110 with sectional views of augmented details of several parts that can be fitted with sound insulation elements 10. Said parts comprise inter alia window frames 112 or doors 114. Further parts that are not shown her are for example bathroom walls, sanitary piping and heating installation.

Elements of the residential house 110 that are hollow can alternatively be filled with particles 14 of the granular material 12 directly without supplying an explicit supporting structure 40 having a porous composition.

Figure 15:
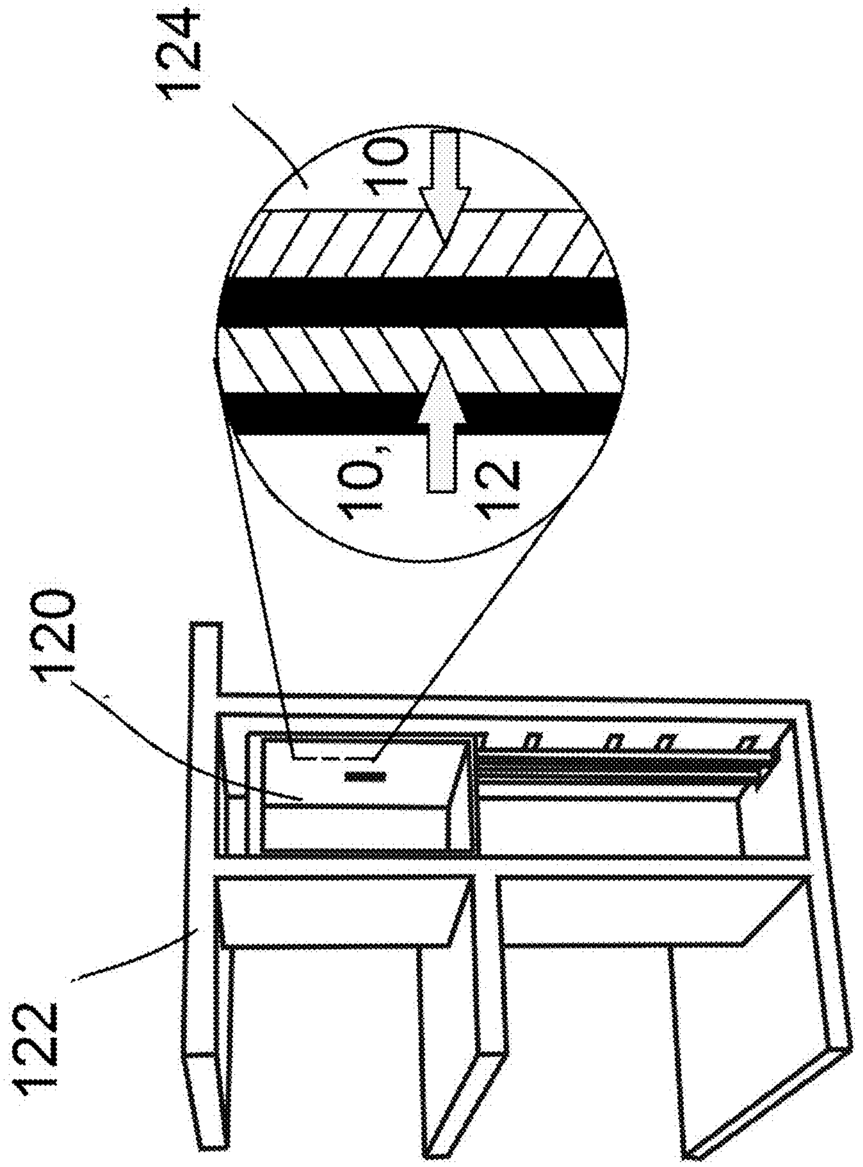
FIG. 15 is a schematic sectional view at an elevator in a building with an augmented detail.

FIG. 15 shows a sectional view at an elevator 120 in a building 122 with a sectional view of an augmented detail of a cabin wall 124 that can be fitted with a sound insulation element 10. Additionally, side walls of a shaft for the elevator in the building 122 can be fitted with a sound insulation element 10. The cabin walls 124 which are hollow can alternatively be filled with particles 14 of the granular material 12 directly without supplying an explicit supporting structure 40 having a porous composition.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being defined by the claims appended hereto, taking account of the equivalents thereof.

REFERENCE SIGNS

10 Sound Insulation Element
12 Granular Material
14 Particles
40 Supporting Structure
41 Wall
42 Cavity
45 Woven Fabric
46 Non-woven Fabric
50 Cover
60 Passenger Car
61 Engine Bonnet
62 Roof Structure
63 Sillboard
64 Pillar
65 Door
70 Mobile Home Car
71 Engine Bonnet
72 Side Wall
74 Pillar
80 Boat
81 Outside Wall
82 Inside Wall
83 Separating Wall
90 Train
91 Outside Wall
92 Inside Wall
95 Roof Structure
100 Airplane
101 Outside Wall
102 Inside Wall
105 Turbine Engine
110 Residential House
112 Window Frame
114 Door
120 Elevator
122 Building
124 Cabin Wall
201 first sound transmitting system
202 second sound transmitting system
203 third sound transmitting system
204 fourth sound transmitting system
210 sound emitter
212 sound recipient
214 separation element
301 Styropor
302 Stonewool
303 Styrodur
304 FAI30M
305 material with particle size distribution according to invention
i Serial Number of maximum mode
i−1 Serial Number of preceding mode
i+1 Serial Number of subsequent mode
D Equivalent Outer Diameter
$D_i$ Fundamental Equivalent Outer Diameter of maximum mode
$D_{i-1}$ Preceding Equivalent Outer Diameter of preceding mode
$D_{i+1}$ Subsequent Equivalent Outer Diameter of subsequent mode
N Number of Particles
$N_i$ Maximum Number of Particles of maximum mode
$N_{i-1}$ Preceding Number of Particles of preceding mode
$N_{i+1}$ Subsequent Number of Particles of subsequent mode
p Sound wave pressure
$p_0$ Reference sound wave pressure
SPLR Sound pressure level reduction
STL Sound transmission loss

The invention claimed is:

1. A sound insulation element, that utilizes a strong force-network as a principle energy dissipating mechanism, wherein the strong force-network is generated through complex interactions of solid particles in a granular system, which leads to periodic formation of maximal number of interconnecting pairs-of-forces according to 3'd Newton's Law, wherein said strong force-network is realized by using a granular material made from at least one solid material with a specific skewed multimodal particles-size-distribution, comprising a granular material comprising particles, and a supporting structure having at least one cavity, whereat the at least one cavity is filled with particles of the granular material, characterized in that a distribution assigning a number (N) of particles to an equivalent outer diameter (D) of the particles is selected such that the particles form an energy dissipating strong force-network within the at least one cavity, wherein the distribution assigning a number (N) of particles to an equivalent outer diameter (D) of the particles is an asymmetric distribution, wherein the distribution of equivalent outer diameters (D) of the particles is multimodal, and wherein said multimodal distribution is skewed, such that said multimodal distribution has one maximum mode (i) having a maximum number ($N_i$) of particles assigned to a fundamental equivalent outer diameter ($D_i$) of particles, and wherein said maximum mode (i) has at least one preceding mode (i−1) and at least one subsequent mode (i+1).

2. The sound insulation element according to claim 1, wherein the particles have an equivalent outer diameter (D) which is between 0.0001 mm and 10 mm.

3. The sound insulation element according to claim 1, wherein the at least one preceding mode (i−1) has a preceding number ($N_{i-1}$) of particles assigned to a preceding equivalent outer diameter ($D_{i-1}$) of particles which is smaller than the fundamental equivalent outer diameter ($D_i$) of particles, and the at least one subsequent mode (i+1) has a subsequent number ($N_{i+1}$) of particles assigned to a subsequent equivalent outer diameter ($D_{i+1}$) of particles which is bigger than the fundamental equivalent outer diameter ($D_i$) of particles.

4. The sound insulation element according to claim 1, wherein the multimodal distribution has at least a section to the left of the maximum mode (i) which comprises a plurality of modes and which comprises the maximum mode (i), wherein the number (N) of particles assigned to the equivalent outer diameter (D) of the particles is decreasing when the equivalent outer diameter (D) of the particles is decreasing such that an envelope curve over the mode peaks is negatively skewed.

5. The sound insulation element according to claim 4, wherein within said section in which the envelope curve over the mode peaks is negatively skewed, a ratio $$RD_k=\{D_k/D_{k-1}\}_{k=i,i-1,i-2,\ldots}=\{D_i/D_{i-1},D_{i-1}/D_{i-2},D_{i-2}/D_{i-3},\ldots\}$$

is bigger or equal to 1.2 and is smaller or equal to 2.1, such that $$1.2\leq RD_k\leq 2.1,$$

wherein a number ($N_k$) assigned to the equivalent outer diameter ($D_k$) of an elected mode (k) is bigger than a number ($N_{k-1}$) assigned to the equivalent outer diameter ($D_{k-1}$) of an adjacent mode (k−1).

6. The sound insulation element according to claim 4, wherein within said section in which the envelope curve over the mode peaks is negatively skewed, a ratio $$RD_k=\{D_k/D_{k+1}\}_{k=i,i+1,i+2,\ldots}=\{D_i/D_{i+1},D_{i+1}/D_{i+2},D_{i+2}/D_{i+3},\ldots\}$$

is equal to (1+√5)/2 or to any integer divider of said value, such that $$RD_k=(1+\sqrt{5})/2 \text{ or } RD_{k=(}n^*(1+\sqrt{5})/2$$

wherein a number ($N_k$) assigned to the equivalent outer diameter ($D_k$) of an elected mode (k) is bigger than a number ($N_{k-1}$) assigned to the equivalent outer diameter ($D_{k-1}$) of an adjacent mode (k−1).

7. The sound insulation element according to claim 1, wherein the multimodal distribution has at least a section to the right of the maximum mode (i) which comprises a plurality of modes and which comprises the maximum mode (i), and wherein the number (N) of particles assigned to the equivalent outer diameter (D) of the particles is decreasing when the equivalent outer diameter (D) of the particles is increasing such that an envelope curve over the mode peaks is positively skewed.

8. The sound insulation element according to claim 7, wherein within said section in which the envelope curve over the mode peaks is positively skewed, a ratio $$RD_k=\{D_k/D_{k+1}\}_{k=i,i+1,i+2,\ldots}=\{D_i/D_{i+1},D_{i+1}/D_{i+2},D_{i+2}/D_{i+3},\ldots\}$$

is bigger or equal to 0.45 and is smaller or equal to 0.8, such that $$0.45\leq RD_k\leq 0.8,$$

wherein a number ($N_k$) assigned to the equivalent outer diameter ($D_k$) of an elected mode (k) is bigger than a number ($N_{k+1}$) assigned to the equivalent outer diameter ($D_{k+1}$) of an adjacent mode (k+1).

9. The sound insulation element according to claim 7, wherein within said section in which the envelope curve over the mode peaks is positively skewed, a ratio $$RD_k=\{D_k/D_{k+1}\}_{k=i,i+1,i+2,\ldots}=\{D_i/D_{i+1},D_{i+1}/D_{i+2},D_{i+2}/D_{i+3},\ldots\}$$

is equal to 2/(1+√5) or to any integer divider of said value, such that $$RD_k=2/(1+\sqrt{5}) \text{ or } RD_k=2/(n^*(1+\sqrt{5}))$$

wherein a number ($N_k$) assigned to the equivalent outer diameter ($D_k$) of an elected mode (k) is bigger than a number ($N_{k+1}$) assigned to the equivalent outer diameter ($D_{k+1}$) of an adjacent mode (k+1).

10. The sound insulation element according to claim 4, wherein within a section in which the envelope curve over the mode peaks is negatively skewed, ratios $$RN_k=\{N_k/N_{k-1}\}_{k=i,i-1,i-2,\ldots}=\{N_i/N_{i-1},N_{i-1}/N_{i-2},\ldots\}$$

are bigger or equal to 1.2 and are smaller or equal to 2.1, such that $$1.2\leq RN_k\leq 2.1,$$

wherein a number ($N_k$) assigned to the equivalent outer diameter ($D_k$) of an elected mode (k) is bigger than a number ($N_{k-1}$) assigned to the equivalent outer diameter ($D_{k-1}$) of an adjacent mode (k−1).

11. The sound insulation element according to claim 4, wherein within a section in which the envelope curve over the mode peaks is negatively skewed, ratios $$RN_k=\{N_k/N_{k-1}\}_{k=i,i-1,i-2,\ldots}=\{N_i/N_{i-1},N_{i-1}/N_{i-2},\ldots\}$$

are equal to (1+√5)/2 or to any integer multiplier of said value, such that $$RN_k=(1+\sqrt{5})/2 \text{ or } RN_k=n^*(1+\sqrt{5})/2$$

wherein a number ($N_k$) assigned to the equivalent outer diameter ($D_k$) of an elected mode (k) is bigger than a number ($N_{k-1}$) assigned to the equivalent outer diameter ($D_{k-1}$) of an adjacent mode (k−1).

12. The sound insulation element according to claim 7, wherein within a section in which the envelope curve over the mode peaks is positively skewed, ratios $$RN_k=\{N_k/N_{k-1}\}_{k=i,i-1,i-2,\ldots}=\{N_i/N_{i-1},N_{i-1}/N_{i-2},\ldots\}$$

are bigger or equal to 1.2 and are smaller or equal to 2.1, such that $$1.2\leq RN_k\leq 2.1,$$

wherein a number ($N_k$) assigned to the equivalent outer diameter ($D_k$) of an elected mode (k) is bigger than a number ($N_{k+1}$) assigned to the equivalent outer diameter ($D_{k+1}$) of an adjacent mode (k+1).

13. The sound insulation element according to claim 7, wherein within a section in which the envelope curve over the mode peaks is positively skewed, ratios $$RN_k=\{N_k/N_{k-1}\}_{k=i,i-1,i-2,\ldots}=\{N_i/N_{i-1},N_{i-1}/N_{i-2},\ldots\}$$

are equal to $(1+\sqrt{5})/2$ or to any integer multiplier of said value, such that $$RN_k=(1+\sqrt{5})/2 \text{ or } RN_k=n*(1+\sqrt{5})/2$$

wherein a number ($N_k$) assigned to the equivalent outer diameter ($D_k$) of an elected mode (k) is bigger than a number ($N_{k+1}$) assigned to the equivalent outer diameter ($D_{k+1}$) of an adjacent mode (k+1).

14. The sound insulation element according to claim 1, wherein the at least one cavity has an equivalent inner diameter which is selected large enough that a sufficient number of particles can form the strong force-network.

15. The sound insulation element according to claim 1, wherein the particles are tightly arranged in the at least one cavity such that the particles form a strong force-network within the at least one cavity.

16. The sound insulation element according to claim 1, wherein the supporting structure is covered by a cover, the cover keeping the particles within the supporting structure.

17. A use of a sound insulation element according to any of the preceding claims in automotive applications, in mechanical engineering applications, in electrical engineering applications, in aerospace engineering applications, in transport applications, in naval engineering applications or in civil engineering applications.

18. The sound insulation element according to claim 1, wherein the supporting structure has at least one cavity configured such that the interaction of the particles in the cavity can lead to the periodical formation of maximal number of interconnecting pairs-of-forces when exposed to sound pressure waves.

19. The sound insulation element according to claim 1, wherein the sound insulation element is configured to allow the periodic formation of maximal number of interconnecting pairs-of-forces when exposed to sound pressure waves.

* * * * *